US008798546B2

(12) United States Patent
Banwell et al.

(10) Patent No.: US 8,798,546 B2
(45) Date of Patent: Aug. 5, 2014

(54) DIRECTIONAL FILTER FOR SEPARATING CLOSELY SPACED CHANNELS IN AN HF TRANSCEIVER

(75) Inventors: Thomas Banwell, Howell, NJ (US);
James L. Dixon, Bridgewater, NJ (US);
John C. Koshy, Jackson, NJ (US);
David L. Waring, Randolph, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 310 days.

(21) Appl. No.: 13/017,482

(22) Filed: Jan. 31, 2011

(65) Prior Publication Data

US 2012/0195351 A1    Aug. 2, 2012

(51) Int. Cl.
*H04B 1/00*    (2006.01)

(52) U.S. Cl.
USPC .......................................... 455/63.1; 333/109

(58) Field of Classification Search
None
See application file for complete search history.

(56) References Cited

U.S. PATENT DOCUMENTS

| 7,310,497 | B2 | 12/2007 | Dore et al. |
| 7,454,167 | B2 | 11/2008 | Cleveland |
| 7,937,044 | B2 * | 5/2011 | Choi et al. ................ 455/63.1 |
| 2002/0060623 | A1 | 5/2002 | Fuenfgeld et al. |
| 2005/0286448 | A1 | 12/2005 | Proctor et al. |
| 2008/0233880 | A1 | 9/2008 | Rofougaran et al. |
| 2008/0280571 | A1 | 11/2008 | Rofougaran et al. |
| 2009/0186582 | A1 | 7/2009 | Muhammad et al. |
| 2009/0213770 | A1 | 8/2009 | Mu |
| 2010/0069011 | A1 * | 3/2010 | Carrick et al. ............... 455/63.1 |

OTHER PUBLICATIONS

S. Lucyszyn et al., MMIC tunable active notch filter, May 23, 1996, Electronic Letters, vol. 32 No. 11, pp. 980-981.*
International Application No. PCT/US2012/023275—PCT International Search Report dated Apr. 17, 2012.

* cited by examiner

*Primary Examiner* — Nay A Maung
*Assistant Examiner* — Alejandro Rivero
(74) *Attorney, Agent, or Firm* — Philip J. Feig

(57) ABSTRACT

Apparatus and methods of simultaneous transmission and reception in a single-antenna radio transceiver. The transceiver may be used, for instance, for communication between at least two terminals, by use of multiple intermediate recruited transceiver nodes. The recruited transceiver nodes receive a signal from a master mode, and then retransmit the signal to a receiver. The recruited transceiver nodes are designed to have reduced interference between the transmit channel and the received channel. In accordance with one aspect of the present application, embodiments can achieve more robust wireless communication between a transmitter and an over-the-horizon receiver. The robust wireless communication will have improved resistance to interference, including self-interference, and improved communication range.

9 Claims, 18 Drawing Sheets

DIRECTIONAL FILTER FOR SEPARATING CLOSELY SPACED CHANNELS IN AN HF TRANSCEIVER

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of US government contracts N00014-05-C-0070, N00014-07-C-0131, and N00014-09-C-0021, all awarded by The Office of Naval Research.

FIELD

Embodiments of the present invention relate generally to transceivers for use in wireless communication systems, and in particular to methods and apparatus for cancelling transmitter leakage in a wireless transceiver. This is useful in order to transmit and receive at the same time through a common antenna with closely spaced frequencies.

BACKGROUND

Because the transmitter section of the transceiver typically outputs signals at a power level much higher than that of signals received by the receiver section of the transceiver, the receiver section may suffer from self-interference from the transmitter section in many situations. This self-interference, sometimes called crosstalk, self-jamming, or transmitter leakage, results from coupling of the transmitted signal to the receiver section principally through reflections caused by antenna or impedance mismatch.

The block diagram for a representative transceiver is illustrated in FIG. 1 based on digital waveform generation and digital IF signal processing. The transmit signal in this case is created using direct digital synthesis (DDS) which is amplified to 5 W in a linear power amplifier and coupled to the whip antenna through a transmit/receiver coupler and narrow band antenna match. A signal received by the antenna is conveyed by the coupler to a double conversion receiver where it is processed to a digital IF/baseband signal. The received signal is up-converted to a 45 MHz IF using a high dynamic range balanced mixer that is driven by a 47-75 MHz synthesizer. A two-pole crystal filter selects the desired HF signal component. The Analog to Digital Converter ("ADC") is driven by a narrow-band low-noise amplifier.

There are several well known methods for implementing the transmit/receive coupler. A switch is employed in a wide range of applications where talk and listen do not occur simultaneously, as with most HF transceivers. A second well know method of sharing an antenna is to use a frequency selective diplexer. Such circuits generally work well for frequency separations of 10 MHz or more. Diplexers can be built using resonant cavities that work at VHF frequencies (>100 MHz) but do not meet the SWAP requirements for a man-portable transceiver (size≈1 cubic foot, weight≈5 lbs).

BRIEF SUMMARY OF THE INVENTION

The present application relates, in general, to apparatus and methods of transmission and reception in a single-antenna radio transceiver. The transceiver may be used, for instance, for communication between at least two terminals, by use of multiple intermediate recruited transceiver nodes. The plurality of recruited transceiver nodes receive information in a signal from a master node, and retransmit the information in a second signal to a receiver. The recruited transceiver nodes are designed to have reduced interference between the transmit channel and the received channel thereby allowing simultaneous operation of receive and transmit functions. In accordance with one aspect of the present application, embodiments can achieve more robust wireless communication between a transmitter and an over-the-horizon receiver. The robust wireless communication will have improved communication range, extended battery life, and improved resistance to external and self interference.

One aspect of the present invention is a method to reduce interference between a transmitted signal and received signal in a transceiver. The method preferably includes receiving a transmitter signal at a first port of a directional coupler; splitting the transmitter signal into a first transmit portion directed to a second port of the directional coupler, and a second transmit portion directed to a third port of the directional coupler, wherein the second port is coupled to an antenna and the third port is coupled to an adjustable impedance; and filtering the second transmit portion by use of the adjustable impedance to produce a filtered second transmit portion. The method may further include reflecting at least a portion of the filtered second transmit portion into the third port of the directional coupler; receiving an incoming signal at the second port of the directional coupler, the incoming signal including a received portion and a reflected portion, wherein the reflected portion is a partial reflection of the first transmit portion; and combining the incoming signal at the second port of the directional coupler and the reflected signal at the third port of the directional coupler, to produce a combined signal at a fourth port of the directional coupler. Preferably, in the combined signal, the reflected signal from the third port cancels at least a portion of the partial reflection of the first transmit portion from the second port.

Further in accordance with this aspect of the present invention, adjusting comprises adjusting the adjustable impedance based on a characteristic of the transmitter signal. The method may also further comprise adjusting the adjustable impedance based on a characteristic of the transmitter signal and a characteristic of an impedance load coupled to the second port.

Further in accordance with this aspect of the present invention injecting may comprise injecting into the third port of the directional coupler a filtered sample of the transmit signal, wherein the transmit signal is filtered by use of a tracking algorithm coupled to the combined signal.

Further still in accordance with this aspect of the present invention, the filtered and reflected second transmit portion substantially cancels the partial reflection of the first transmit portion within a predetermined bandwidth. In addition, the adjustable impedance may produce a notch frequency rejection in the combined signal, the notch frequency centered at a carrier frequency of the transmitter signal; and the adjustable impedance may produce a rejection in the combined signal, over a predetermined range of frequencies including a carrier frequency of the transmitter signal.

Another aspect of the present invention is an apparatus for cancelling at least a portion of an interfering transmitted signal from a received signal in a transceiver. The apparatus preferably comprises a four-port directional coupler, wherein a first port is an input port coupled to a bidirectional second port and a bidirectional third port, the bidirectional third port is further connected to a fourth port, and the fourth port is an output port further coupled to the second port, wherein the transmitted signal is provided to the first port; an adjustable source coupled to the third port; an adjustable source coupled to the third port; and a controller to control the adjustable source based on a characteristic of the transmitted signal detected at the fourth port.

In accordance with this aspect of the present invention, the controller comprises a processor coupled to a memory storage, the memory storage configured to store a tracking algorithm, where in the tracking algorithm is operably coupled to the signal from the fourth port. Further still, the adjustable source comprises a digital filter having an input coupled to the transmit signal and an output coupled to the third port, wherein the digital filter is operably controlled by the tracking algorithm.

In another aspect, the present invention is for a cooperative wireless communication, comprising a master node that transmits a first signal at a first frequency; a plurality of recruited nodes configured to receive the first signal and simultaneously produce a rebroadcast signal by rebroadcasting the first signal at a second frequency to a receiver, the second frequency being located at a fixed frequency offset from the first signal; an active cancellation circuit within one or more of the recruited nodes, the active cancellation circuit configured to cancel at least a portion of a leakage of the rebroadcast signal from the received first signal, wherein each of the rebroadcast signals are substantially similar.

In accordance with this aspect of the present invention, the first signal and the rebroadcast signal are preferably uncorrelated. Further, the recruited nodes may comprise a BPSK demodulator to receive the first signal from the master node, and a QPSK modulator to produce the rebroadcast signal. In addition, a master node is reconfigurable as a recruitment node, and a recruitment node is reconfigurable a master node.

In yet another aspect, the present invention may comprise an antenna. The antenna preferably includes antenna matching circuitry, a directional coupler coupled to the antenna matching circuitry and operable to receive a transmit signal and output a receive signal, and a compensating impedance coupled to the directional coupler and operable to produce a compensating impedance signal that substantially cancels a signal reflected by the antenna matching circuitry.

The foregoing is a summary and thus contains, by necessity, simplifications, generalizations, and omissions of detail; consequently, those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and, therefore, are not to be considered limiting of its scope; the disclosure will be described with additional specificity and detail through use of the accompanying drawings.

DETAILED DESCRIPTION

Figure 1:
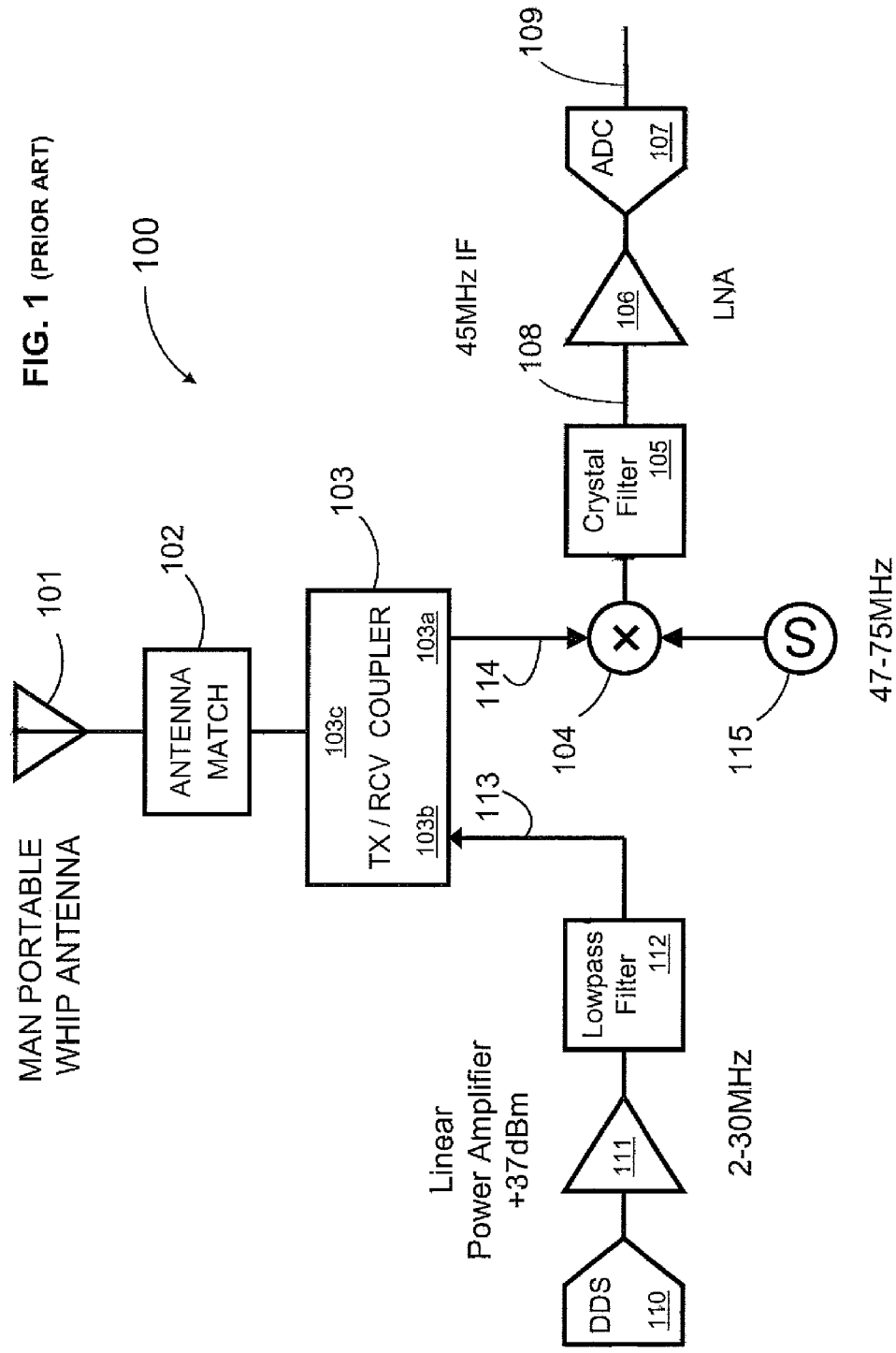
FIG. 1 illustrates a block diagram of a transceiver as known in the art.

In the following detailed description, reference is made to the accompanying drawings, which form a part hereof. In the drawings, similar symbols or reference numbers typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated and make part of this disclosure.

This disclosure is drawn, inter alia, to methods, apparatus, computer programs and systems related to transmit interference mitigation in a transceiver that preferably has simultaneous transmit and receive functions. This disclosure is also drawn to a communication network that uses one or more such transceivers, and methods of operating such a communication network.

A human-portable or battery operated hand-held transceiver often operates in the high frequency band ("HF"), considered herein as 2-30 MHz, and typically has a single whip antenna of about 2-3 meters in length. The portable transceivers are often carried by emergency services providers and warfighters in order to communicate with each other and/or with a distant base or ship that is over the horizon ("OTH"). A plurality of such portable transceivers can be configured as nodes in an ad-hoc network to provide cooperative robust and jam-resistant OTH communications.

FIG. 1 shows a transceiver 100 in functional block diagram form, as known in the art. Functionally, an incoming HF signal received by transceiver 100 enters whip antenna 101 and is passed to the narrow band antenna match circuit 102, which produces a matched signal. The matched signal enters bidirectional input/output port 103c of transmit/receive coupler 103, which passes all or some of the receive signal to output port 103a of transmit/receive coupler 103. The signal present at port 103a is the receiver input signal 114 which is then converted to a converted IF signal, centered at 45 MHz for example, by use of mixer 104. Mixer 104 is driven by a synthesizer 115 that is preferably tunable within the frequency range of 47-75 MHz, for example. The converted IF signal is then filtered, for instance by a two-pole crystal filter 105 centered at 45 MHz, in order to produce a filtered IF signal 108. The filtered IF signal is then amplified by one or more stages of a low noise amplifier 106 ("LNA"), in order to produce an amplified IF signal, which is then digitized by an analog to digital converter 107 ("ADC") to create digital IF signal 109.

Referring again to FIG. 1, a transmit signal is created by use of a direct digital synthesizer 110 ("DDS"), which is then amplified to approximately 5 W (+37 dBm) in a linear power amplifier 111. The amplified signal is filtered by low pass filter 112 to create a filtered transmit signal 113 which enters transmit/receive coupler 103 at input port 103b, and is substantially passed to bidirectional input/output port 103c. The signal from bidirectional input/output port 103c is passed through narrow band antenna match circuit 102, and is then broadcast through a whip antenna 101.

Implementations of transmit/receive coupler 103 in the prior art include a single pole double throw ("SPDT") switch that is used when talking and listening do not occur simultaneously. While a switch may provide the desirable feature of low insertion loss, a switch may not be suitable where it is preferred to receive and transmit simultaneously on closely spaced channels.

Another implementation of transmit/receive coupler 103 known in the prior art includes a diplexer. A diplexer implemented with a high-pass filter and a low-pass filter, for example, can be used in FDM systems where the channels are separated by at least 50-200 MHz. A resonant cavity diplexer, implemented with high-Q resonant filters, can separate signals having a 250 kHz spacing at VHF frequencies; however, these devices are rather large (typically 30 cm×50 cm×15 cm) and heavy (typically 10 lbs). Currently available diplexers do not have a physical form or sufficient selectivity (high enough Q factor) to be suitable for a human-portable transceiver operating at HF or VHF frequencies.

Embodiments of the present invention may implement transmit/receive coupler 103 as a directional coupler for applications where simultaneous transmit and receive is desired and the channel spacing is 100 kHz at 2-30 MHz. An example is presented in FIG. 2. There are significant drawbacks to the implementation of transmit/receive coupler 103 using a directional coupler according to prior art, which are discussed below.

Figure 2:
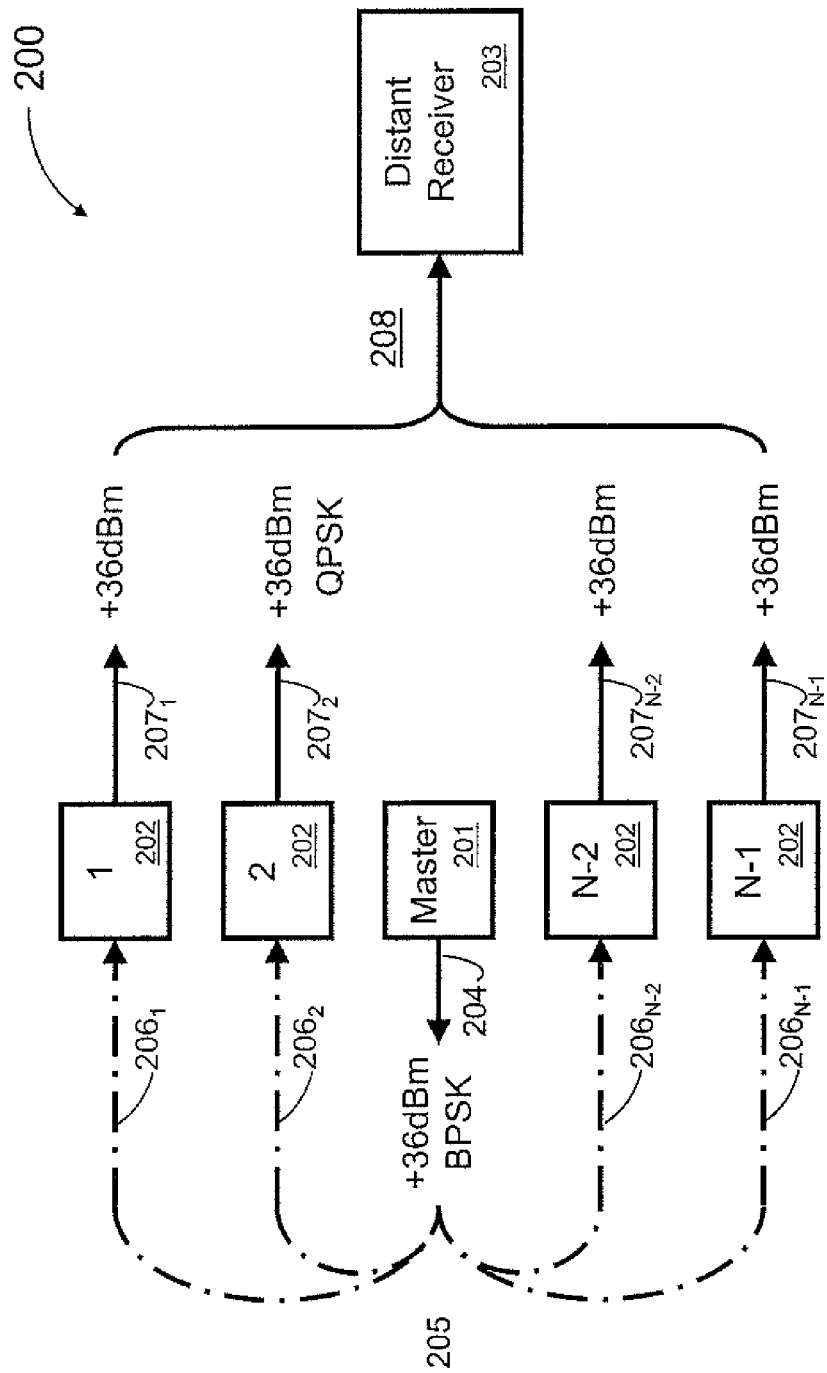
FIG. 2 illustrates cooperative communication using multiple recruitment nodes and multiple-input single output (MISO) signal processing at a far end receiver.

An example of a network of cooperating human-portable transceivers is shown in FIG. 2 as network 200. These transceivers can be carried by, for example, first responders and dismounted military personnel. Each transceiver is a node in the network 200. Within network 200, one node may be designated as a master node 201, and the remaining N−1 nodes in the network can be designated as recruited nodes 202. Each of nodes 201 and 202 can be implemented according to 100. The master node 201 communicates with a distant receiver 203 via the plurality of recruited nodes 202. The master node 201 broadcasts an HF signal 204 having, for example, binary phase shift keying ("BPSK") modulation and a transmit power level of +36 dBm. HF signal 204 propagates over recruitment channel 205 where it is received by each node 202 as receive signal $206_1$-$206_{N-1}$. Nodes 201 and 202 typically are relatively close to each other (for example, less than 50 km), so that groundwave propagation can be used for communications on recruitment channel 205 at HF frequencies. In response to recruitment signal $206_1$-$206_{N-1}$, each of the N−1 cooperating nodes 202 generates a unique transmit signal $207_1$-$207_{N-1}$, respectively, which are received in aggregate form by distant receiver 203 through the over-the-horizon (OTH) channel 208. Each signal $207_1$-$207_{N-1}$ could, for example, have quadrature phase shift keying ("QPSK") modulation and a transmit signal amplitude of +36 dBm. Distant receiver 203 can recover the message sent by master node 201 and conveyed by cooperative nodes 202 using a multi-input single-output) (MISO) algorithm to process the aggregate signal received via channel 208.

For nodes 201, 202 separated by distances of less than 50 km, the recruitment channel 205 ordinarily will use ground wave propagation. The primary signal impairment for ground wave propagation is $R^{-4}$ path loss (i.e., loss proportional to the fourth power of the distance) and location-dependent shadowing or slow fading. Automatic gain control ("AGC") can mitigate the ground wave effects. The OTH channel 208 ordinarily will use skywave or near-vertical incidence skywave propagation to reach a distant receiver, which typically is 200-2000 km away.

According to prior art, transmit signals $207_1$-$207_{N-1}$ could be generated from the respective receive signals $206_1$-$206_{N-1}$ according to the principles of beamforming, whereby each signal $207_1$-$207_{N-1}$ has a specific carrier phase determined by the geographic location such that the maximum aggregate power, approximately +36 dBm+20 log(N−1), is directed towards receiver 203. The beamforming approach also requires that all transmit signals 207 have identical HF carrier frequency and that they be synchronized in time. Such alignment is best accomplished if reception of signal 206 is not interrupted or degraded by transmission of signal 207.

In an alternate application of prior art, transmit signals $207_1$-$207_{N-1}$ could be generated from the respective signals $206_1$-$206_{N-1}$ using randomized space time coding wherein each signal $207_1$-$207_{N-1}$ is uniquely encoded such that distant receiver 203 can optimally demodulate the aggregate signal and thereby achieve a power gain of 10 log(N−1) and a coding gain of approximately +6 dB. Application of a MISO algorithm with space time coding requires that the signals $207_1$-$207_{N-1}$ be synchronized in time, relative to the symbol duration. Space time coding also requires that the difference between the HF carrier frequency of each signal $207_1$-$207_{N-1}$ be small, typically less than 10 Hz; however, there is no requirement to control the HF carrier phase as in beamforming.

Recruitment nodes 202 could store the message sent by master node 201 in whole or in part, thereby allowing transmission of signal 207 and reception of signal 206 to occur at different times using a TDM protocol. A suitable TDM protocol would add significant cost and complexity to the system 200.

The designation of a master node 201 and recruited nodes 202 may depend on factors such as which node is the source of a message, and which node(s) are merely relaying the message, possibly with coding and modulation changes. It is possible for the configuration of network 200 to change, such that one recruited node 202 takes on the role of a master node 201, and the former master node 201 becomes a recruited node 202.

It may be desirable for recruited nodes 202 to receive signal 206 on the recruitment channel 205 and transmit signal 207 on the OTH channel 208 at the same time. As the received signal 206 may be relatively weak, whereas the OTH channel signal 207 is transmitted at a much stronger power level, interference may occur. This will likely occur when a single antenna (such as a human-portable whip antenna) is used in a recruited node 202 that simultaneously transmits and receives signals.

Figure 4:
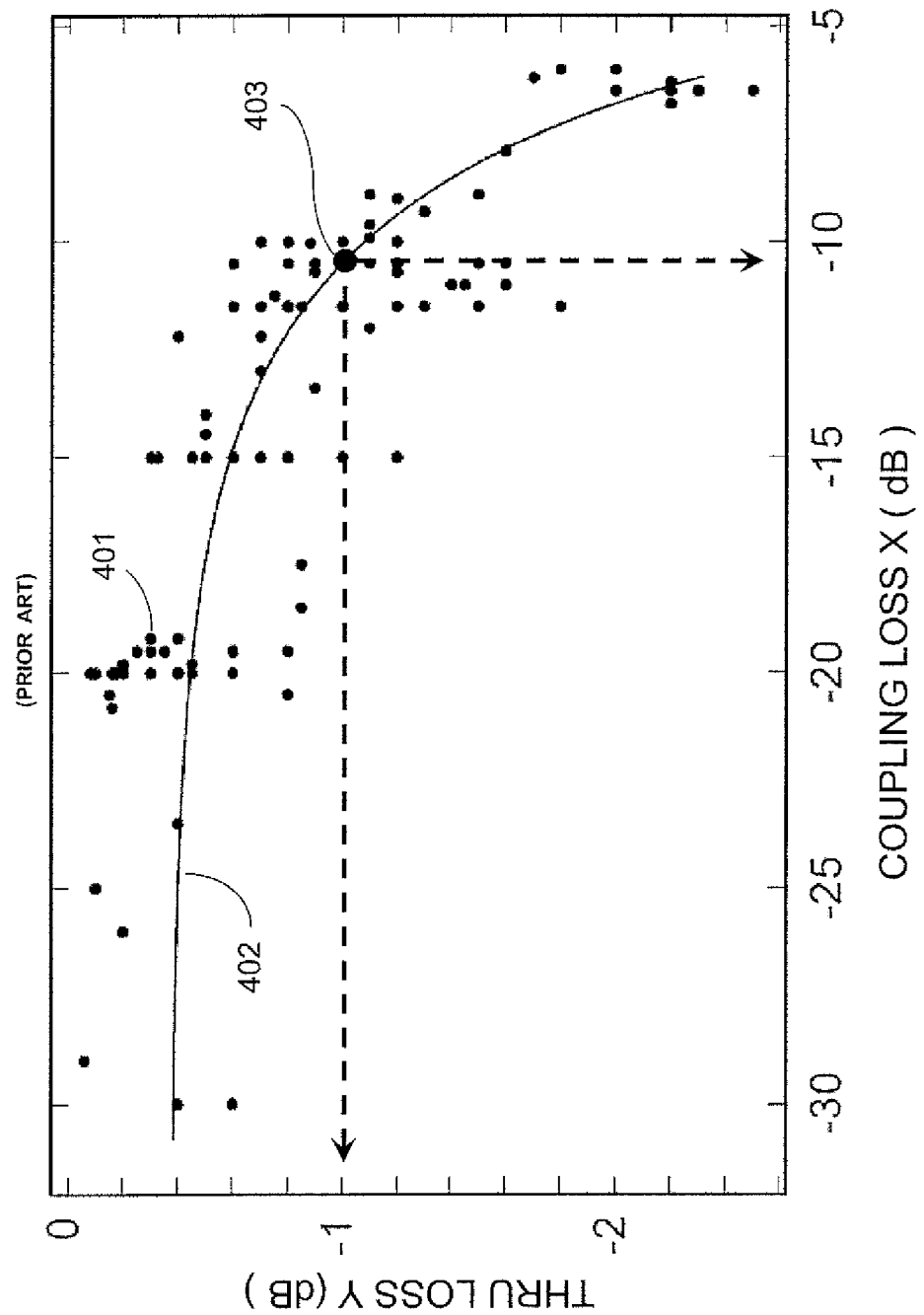
FIG. 4 illustrates the relationship between thru port gain (loss) and coupled port gain (loss) in a directional coupler based on published commercial and experimental data.

Transmit and receive operations can be performed simultaneously when antenna coupler 103 is implemented using a directional coupler. The directional coupler has at least one thru path and one coupled path. A through path can be used to connect port 103b to 103c and a coupled path can be used to connect port 103c to 103a. FIG. 4 illustrates the relationship between thru path gain (loss) Y and coupled path gain (loss) X. The plurality of points 401 represents published data for a large number of experimental and commercial directional couplers. Curve 402 is a least squares regression fit to data 401 using the equation $$10^{(X-\alpha)/10} + 10^{(Y-\beta)/10} = 1 \quad (1)$$

Equation 1 is a consequence of energy conservation. The regression fit yields $\alpha=-0.4$ dB and $\beta=-1.7$ dB with data 401. Antenna coupler 103 could be implemented using a directional coupler whose performance is described by point 403 on curve 402. Point 403 corresponds to 10 dB of coupled path loss and 1 dB of thru path loss. For a given amplitude of filtered signal 113, 1 dB of thru path loss reduces the transmit signal at port 103c by 1 dB, equivalent to a 1 dB reduction of transmit signal 207. A 1 dB reduction in transmitter power is small compared to the overall gain, typically >10 dB, that can be achieved with a MISO algorithm and space-time coding.

Attenuation in the coupled path will diminish receive signal 114 and decrease the allowed distance between nodes 201 and 202. The receiver has a certain sensitivity to receive signal 114 whereby it can respond properly to a transmitter located at distance $R=R_{max}$ when coupler 103 does not attenuate signal 114. The path loss for groundwave propagation in channel 205 is proportional to $1/R^4$. With reference to point 403, 10 dB of receive path loss will diminish the recruitment distance to $R=R_{max} 10^{-1/4}$, or 56% of $R_{max}$. For cooperative communications, a 10 dB reduction in receiver sensitivity may be acceptable in order to achieve no more than 1 dB of transmitter power loss.

Figure 3:
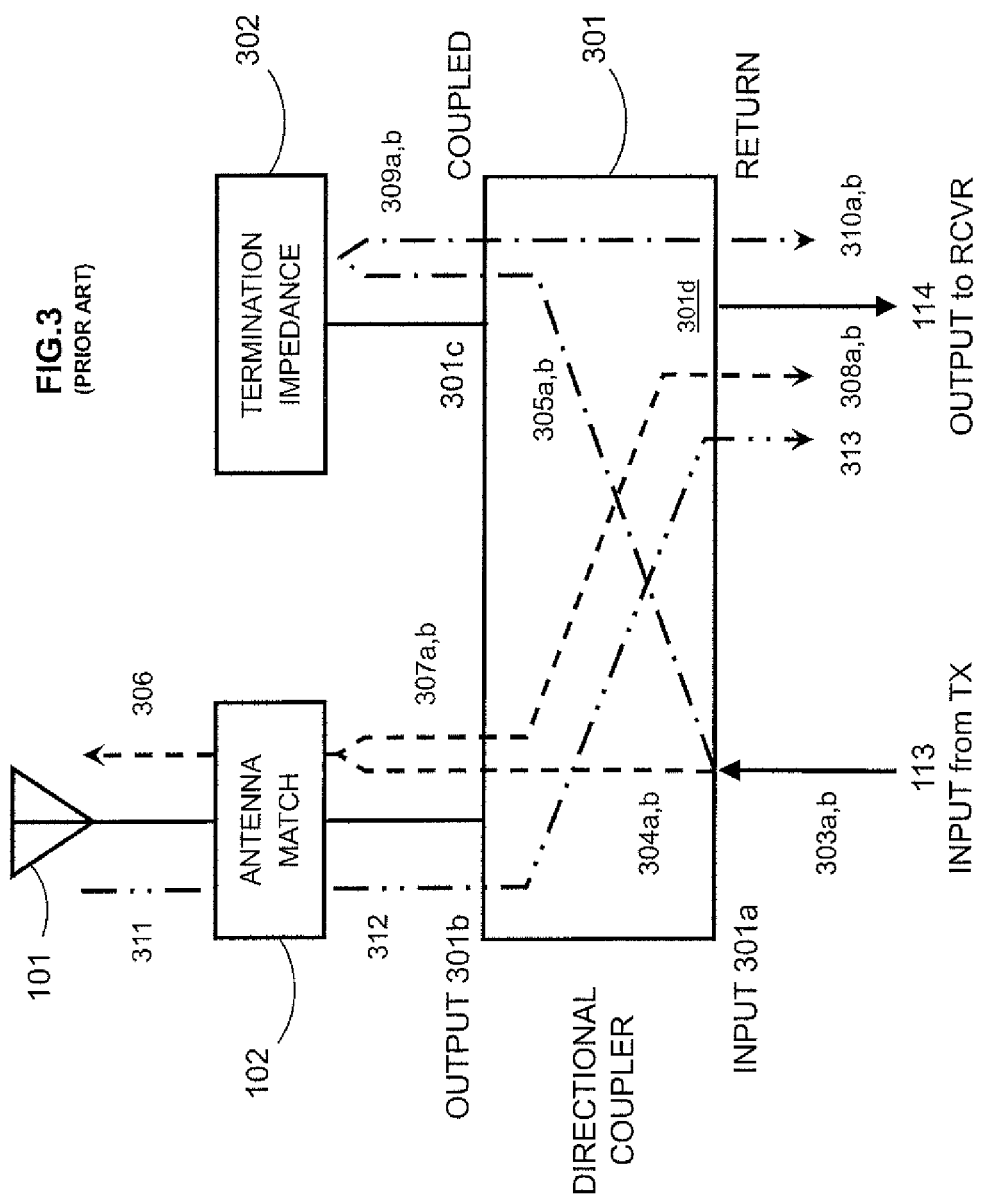
FIG. 3 identifies the signals which flow in a directional coupler that connects together an antenna, transmitter, receiver, and termination impedance.

FIG. 3 illustrates the several signals in a directional coupler 301 performing the function of transmit/receive coupler 103. The transmit signal 113 is comprised of a narrowband HF signal 303a and an incidental signal 303b attributed to wideband phase noise. Transmit signal 303a,b enters port 301a and is split, with one portion of the signal, denoted as 304a,b, directed to bidirectional port 301b with about 1 dB of loss, and a second portion of the transmit signal 305a,b is directed to coupled port 301c with about 10 dB of loss. Most of the transmit signal directed to bidirectional port 301b passes through the antenna match circuit 102, and is radiated by antenna 101. A relatively weaker incoming RF received signal 311 enters from antenna 101, passes through antenna match circuit 102 to emerge as signal 312, and passes through coupler 301 from bidirectional port 301b to port 301d with about 10 dB of loss to appear as the desired signal component 313 of the receiver input signal 114.

A portion of transmit signal 304a,b that is directed to bidirectional port 301b is reflected by impedance mismatch between the coupler 301 and the antenna match circuit 102 to create reflected signal 307a,b. The amount of reflection is determined by the return loss which may have a value between −10 dB to −20 dB. Reflected signal 307a,b re-enters bidirectional port 301b and a portion exits at port 301d with about 10 dB of loss as signal 308a,b.

According to prior art devices and applications, coupled port 301c is connected to termination impedance 302 which is designed so that the signal 305a,b appearing at port 301c is absorbed such that the reflected signal 309a,b has negligible amplitude. The reflected signal appears as reflected signals 310a,b at port 301d. Signal 308a,b and received signal 313 comprise the receiver input signal 114 according to prior art.

Figure 5:
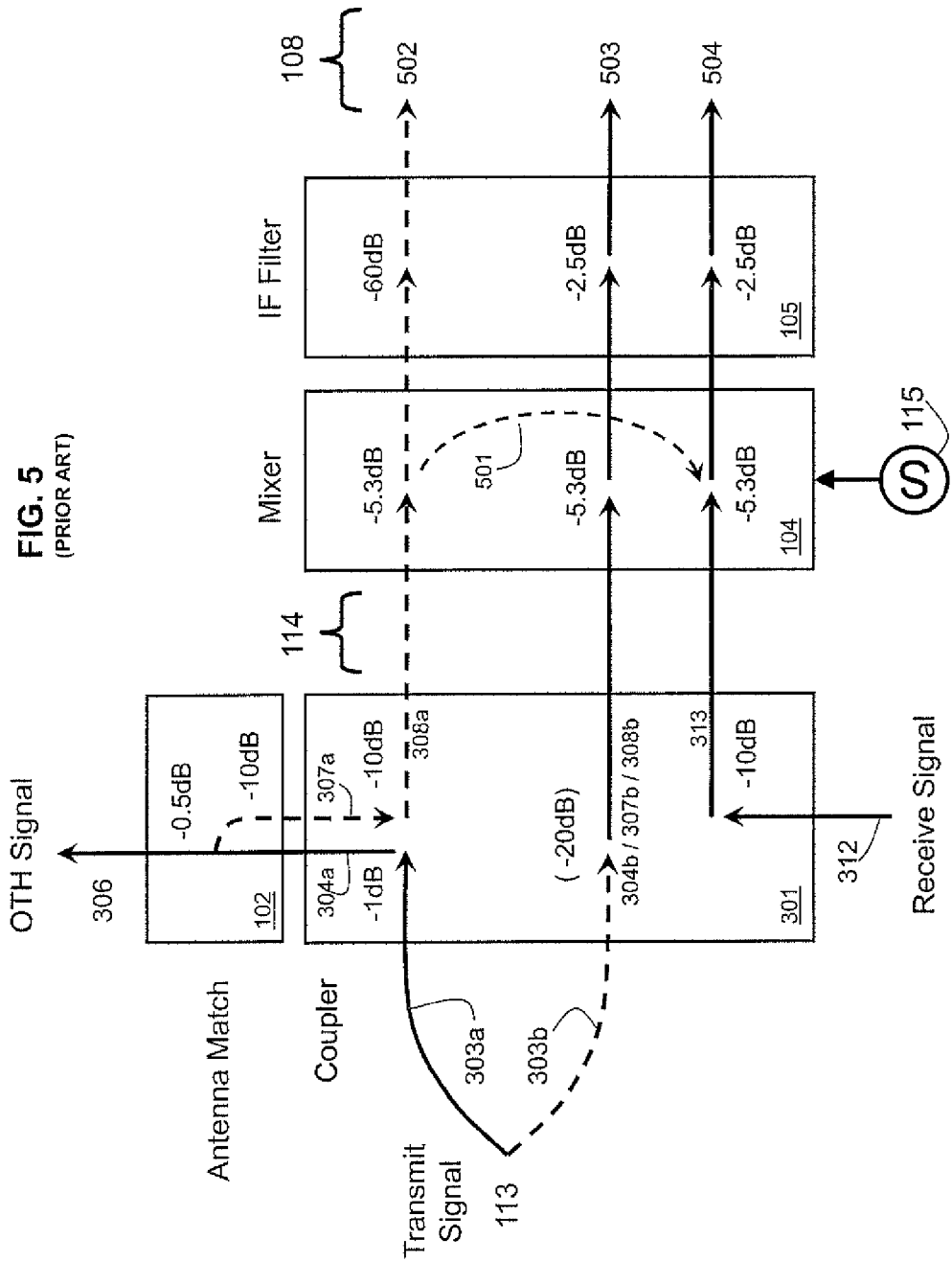
FIG. 5 illustrates predicted signal levels in a transceiver with a conventional directional coupler.

FIG. 5 illustrates an analysis of component signal levels present in a transceiver 100 that uses a directional coupler 301 and termination impedance 302. The coupler and antenna match are illustrated in FIG. 3. There is also shown a high-level mixer 104 and narrow-band crystal filter 105. Transmit signal 113 includes the primary signal 303a and a phase noise signal 303b. Signals 307a and 307b are generated from 304a and 304b, respectively, by reflection at the antenna match. An antenna match return loss of 10 dB and a thru loss of 0.5 dB are assumed. The transmit signal has 1.5 dB loss to the antenna. Mixer 104 converts HF signal 313 into desired IF signal 504. Leakage signals 308a and 308b are also converted to signals 502 and 503, respectively. Signals 502-504 in total comprise the filtered IF signal 108. Signal 501 indicates that signal 308a can interfere with the mixer response and alter the conversion of signal 313 into signal 504 by the mixer if the LO drive from synthesizer 115 is insufficient. Mixer 104 can be characterized by 5.3 dB insertion loss, provided the LO drive has sufficiently large amplitude.

Signal 303a could have a carrier frequency of 22.05 MHz and a magnitude of +37 dBm, for example, while phase noise 303b could be −87 dBc. According to the objectives of HF cooperative communication using a whip antenna, receive signal 312 could have a carrier frequency of 22.15 MHz, being offset from signal 303a by 100 kHz, thereby assuring that both signals can be matched by 102. In this example, the level of signal 308a entering the mixer is +16 dbm. In accordance with the prior art, mixer 104 could be a high level mixer having a +23 dBm LO drive. In such case, transmitter leakage at a power level of +10 dBm or more enter the crystal filter 105, although this exceeds the typical crystal filter input power limit of 0 dBm above which performance degradation arises from electro-mechanical stress. The narrow-band crystal filter 105 can be characterized by 2.5 dB pass-band insertion loss and 60 dB out-of-band rejection at the transmit frequency offset of 100 kHz. Overall, transmitter leakage signal 502 is attenuated by 85.3 dB, while the attenuation of received signal 504 is 17.8 dB. The portion of phase noise 308b within the filter pass-band is attenuated by 27.8 dB and enters the receiver at a power level of −78 dBm; this in-band noise cannot be further suppressed by additional IF filtering.

Figure 6:
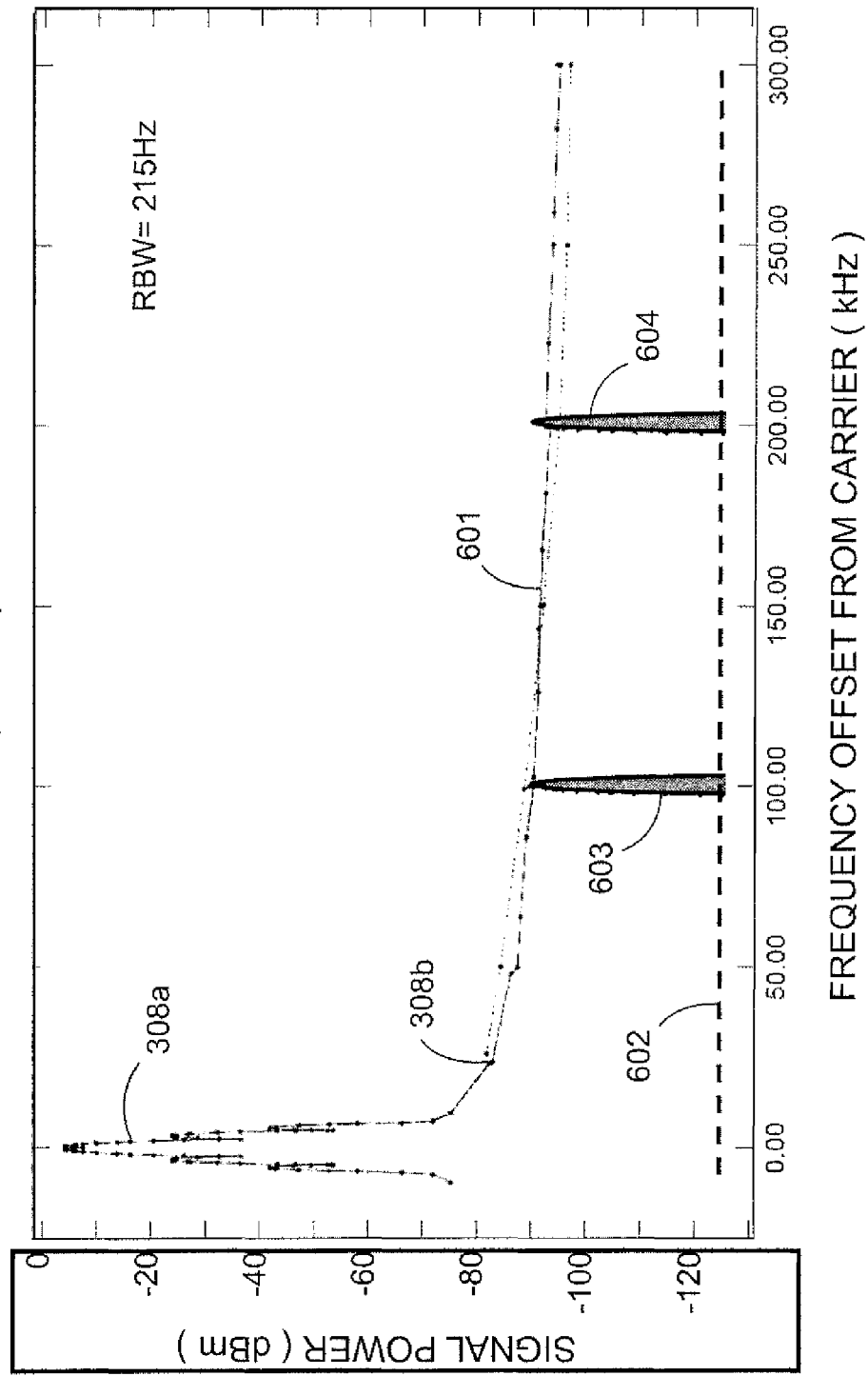
FIG. 6 illustrates measured signal levels at a receiver port with 30 dBm transmit power and 30 dB transmitter isolation.

FIG. 6 illustrates the measured spectrum of signal 114 in a transceiver 100 that uses a directional coupler 301 and termination impedance 302, when transmit signal 113 is characterized by an amplitude of 1 W (+30 dBm), 2400 baud BPSK modulation and phase noise amplitude of −87 dBc. The resolution bandwidth ("RBW") is 215 Hz. In this example, the return loss of antenna coupler 102 is −20 dB and the coupled port attenuation is 10 dB. Two signals 603, 604 are illustrated at 100 kHz and 200 kHz offset from the transmit signal frequency that each represent an input signal 312 with amplitude of −74 dBm. This is a typical value achieved for recruitment distances R of 1-2 km with 5 W of transmit power. Curve 602 represents the sensitivity for an SNR of 10 dB of a typical HF receiver having a 16 dB noise figure. In this example, the mixer sees about −4 dBm from the main signal peak 308a and −90 dBm of transmitter phase noise 308b in a 215 Hz bandwidth. A high-level mixer is again necessary to avoid overload. Signal 308a may have sufficient amplitude to cause spurious signals to appear in the digital IF signal 109 due to non-linearity in the LNA and ADC response. Signal 308a can also enhance the effect of ADC quantization error. The coupled phase noise 308b can severely degrade the receiver sensitivity. The receiver noise floor 601 is substantially increased by transmitter phase noise 308b to a level of about −90 dBm. The noise floor 601 in the vicinity of each of signals 603 and 604 is similar. There is little benefit from increasing the frequency offset from of 100 kHz to 200 kHz or 300 kHz, a typical bandwidth limit for matching a whip antenna, since the noise floor 601 varies slowly with frequency beyond an offset of 50 kHz.

FIGS. 3-6 illustrate that in a conventional transceiver design, transmitter phase noise and/or other spectral interferences will severely degrade receiver sensitivity and should be reduced, otherwise, the phase noise and spectral interferences from the transmitter leakage may be stronger than the desired received signal. Conventional designs known in the art deal with this problem through avoidance, i.e., by avoiding the simultaneously transmission and reception on closely spaced channels over the same antenna. Existing in-line notch filters with sufficient rejection to eliminate the transmit signal also severely degrade the received signal due to limits on selectivity that can be achieved with a two-port analog filter. Traditional echo cancellation methods that only rely on digital signal processing are not appropriate since the transmitter leakage is at a level that overloads the ADC, thereby impairing ADC performance because a quantization step size needed to accommodate the entire dynamic range would produce excessive quantization noise on the relatively low-level received signal.

One or more embodiments of the present invention use a compensating impedance operatively connected to a four-port directional coupler, such that a signal reflected by the compensating impedance can selectively suppress the transmitter leakage by 20-30 dB, optionally including transmitter phase noise, without significant degradation to the adjacent receive signal. Selective suppression is accomplished using controlled reflections from the normally terminated port of the coupler. The controlled reflection can be created using a programmable impedance, as described below.

Figure 7:
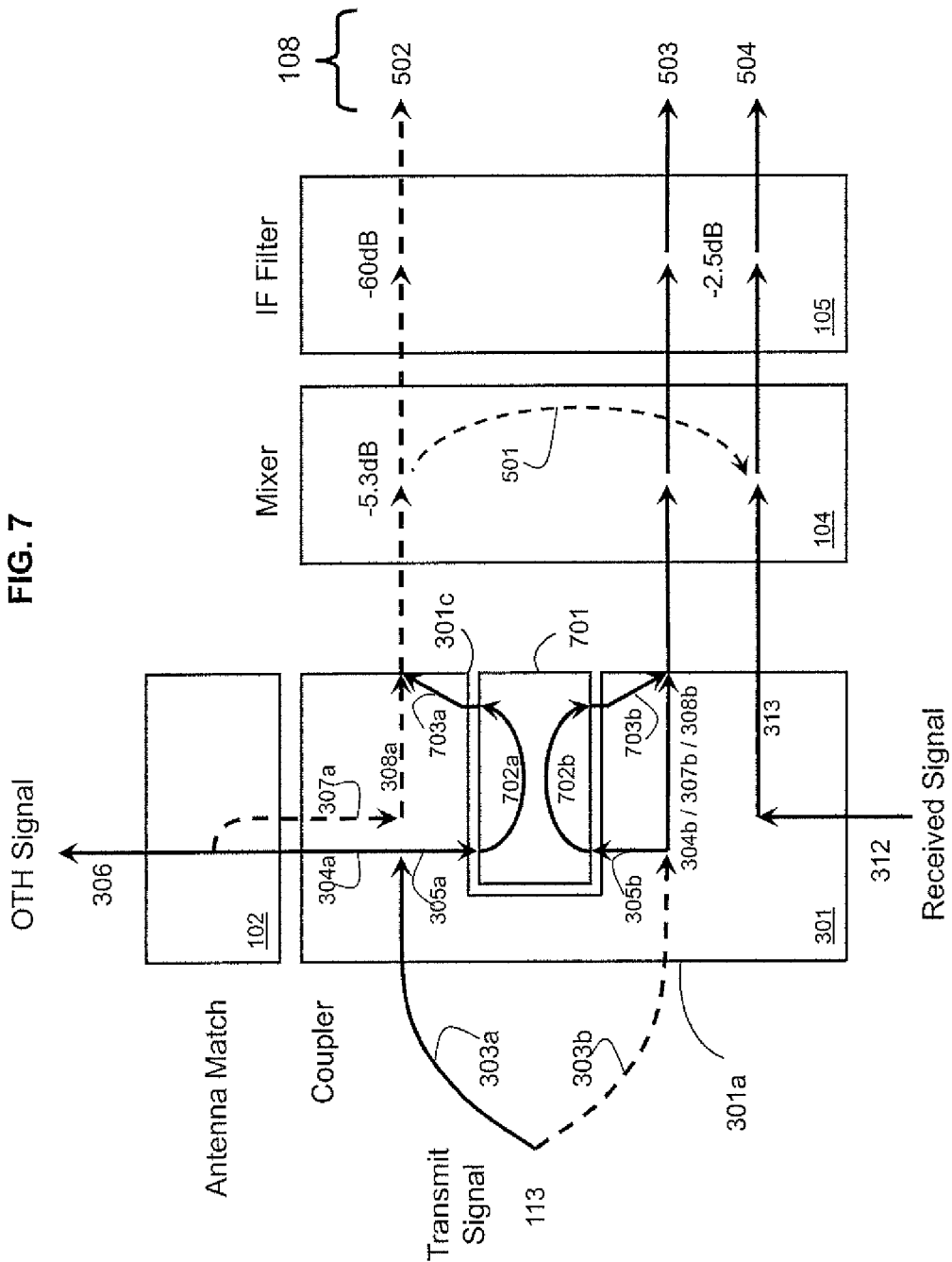
FIG. 7 shows the signal flow in a directional coupler connected to compensating impedance in accordance with an embodiment of the invention.

FIG. 7 illustrates a directional coupler 301 and a compensating impedance 701 connected to coupled port 301c that produces directional filtering using controlled reflections 702, in accordance with an embodiment of the invention. Signals 303a, 303b, 304a, 304b, 305a, 305b, 306, 307a, 307b, 308a, 308b, 312, 313, 502, 503 and 504 are as defined in FIG. 3 and FIG. 5. In particular, a portion of the component signals 303a,b of transmit signal 113 are coupled from port 301a of directional coupler 301 to port 301c as signals 305a, b.

In accordance with one or more embodiments of the invention, the portion of the transmit signal 113 directed to port 301c as signal 305a,b is further directed to a compensating impedance 701, which is a controllable impedance. Compensating impedance 701 is controlled such that reflected signal 702a,b is produced. Reflected signal 702a,b re-enters the directional coupler port 301c and exits the coupler at port 301d as compensating signal 703a,b, along with the received signal 313 and coupled reflected signal 308a,b from the antenna match. The compensating impedance 701 is controlled such that the compensating signal 703a,b substantially cancels the reflected signal 308a,b. The signal flow through directional coupler 301 is such that the desired signal 313 is not significantly affected by compensation impedance 701 when mixer 104 has low input return loss.

Figure 8:
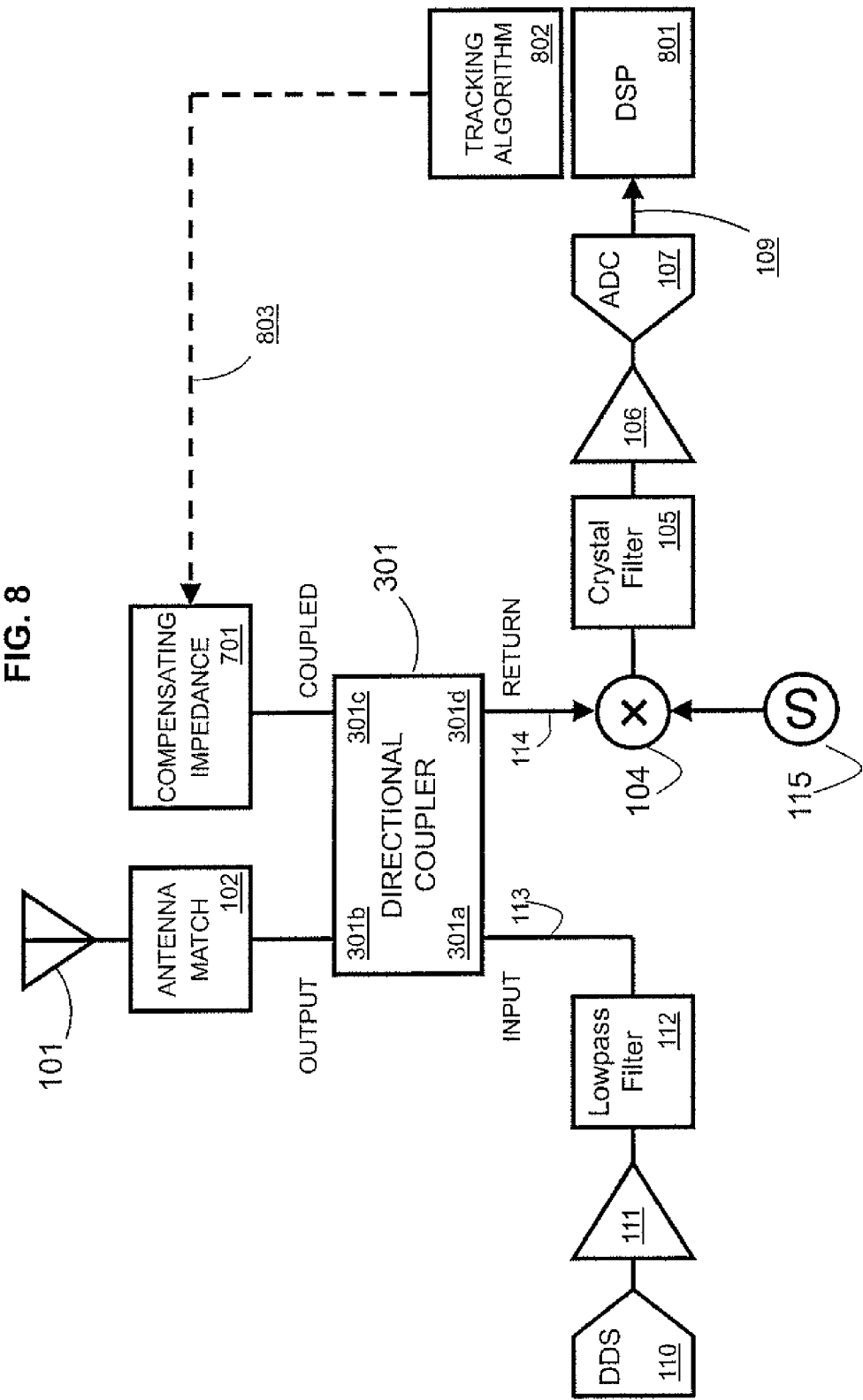
FIG. 8 illustrates a block diagram of a transceiver incorporating a directional notch filter and a circuit to tune parameters of compensation impedance to selectively cancel reflections from antenna mismatch.

Optionally, embodiments of the present invention may include a programmable impedance operatively connected to the coupled port 301c of the directional coupler in order to cancel a transmitter signal reflected from the antenna or from coupler imperfections. FIG. 8 illustrates an architecture to adjust the compensating impedance 701 using feedback from a tracking algorithm 802 associated with a DSP 801. DSP 801 accepts as input the digital IF signal 109. Algorithm 802 creates control signal 803, which may include a plurality of component signals, and alters one or more parameters of the compensation impedance 701.

The tracking algorithm 802 may be implemented as one or more processors that are programmed with software stored in a storage medium, the software being configured to perform the tracking algorithm 802 by use of spectral, temporal, and/or power characteristics of the received signal 114 as determined by DSP 801. Spectral characteristics may include a power spectrum as a function of frequency. Temporal characteristics may include an indication of how a characteristic of the received signal (for example, the spectrum or a power level) changes over time. Power characteristics may include an indication of the power of the received signal or a portion thereof (for example, at a frequency or a band of frequencies). The processor implementing tracking algorithm 802 may, for instance, be the same as DSP 801, or may be a part of DSP 801 (for example, one core in a multi-core processor), or may be separate from DSP 801 but in communication with DSP 801, for instance by either a local electrical connection or by a networking connection that allows for a relatively longer remote connection. The processor is not limited and may also be implemented as an ASIC or other kind of processing device known in the art. The storage medium storing the software is not limited, and may include any physical and electronic medium used for electronic storage, such as a hard disk, ROM, EEPROM, RAM, flash memory, nonvolatile memory, or any substantially and functionally equivalent medium. The software storage may be co-located with the processor implementing tracking algorithm 802, or at least a portion of the software storage may be remotely located but accessible when needed.

Since the desired signal 313 is not significantly affected by the signal 703a,b, the compensating impedance 701 can be tuned to minimize the undesired energy in the receive path, independently of signal 313. The tracking algorithm 802 may use a conventional gradient search method to tune the compensation impedance parameters 803 in real-time. Tuning is most easily accomplished when the transmitted signal 113 at port 301a and the received signal 313 at port 301d are uncorrelated. Uncorrelated signals can be achieved, for instance, when the receive waveform employs BPSK modulation and the transmit waveform employs QPSK modulation.

Figure 9:
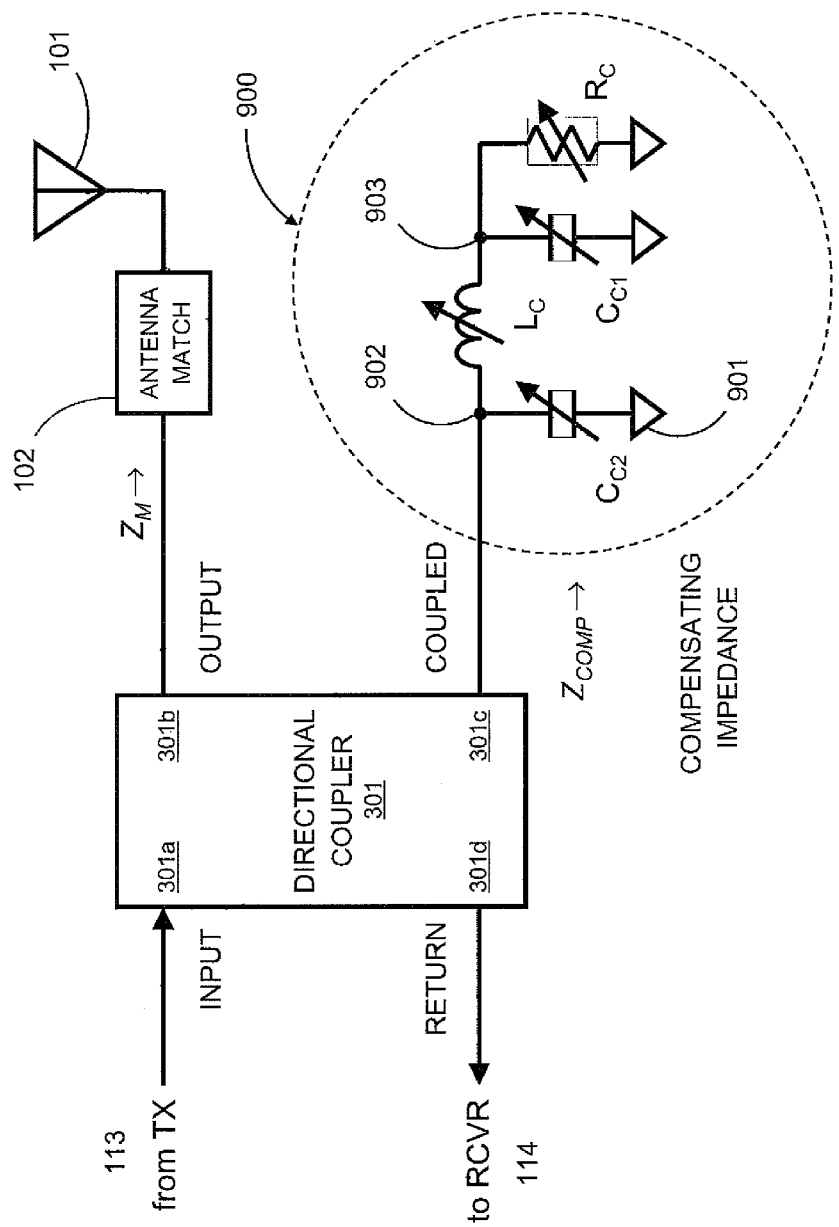
FIG. 9 illustrates an adjustable RLC network to cancel reflection from antenna mismatch over a frequency range.

FIG. 9 illustrates a circuit 900 of an embodiment in accord with one or more embodiments of the invention, for a compensating impedance 701 producing a compensating signal 703. Circuit 900 has a signal ground 901, a terminal node 902 which is connected to port 301c, and an internal node 903. Adjustable resistor $R_C$ and capacitor $C_{C1}$ are each connected between node 903 and ground. Adjustable inductor $L_C$ is connected between nodes 903 and 902. Adjustable capacitor $C_{C2}$ is connected between ground and node 902. Circuit 900 produces a complex impedance $Z_{COMP}$ between node 902 and ground whose frequency response is determined by the values of $L_C$, $C_{C1}$, $C_{C2}$, and $R_C$, collectively referred to as the circuit parameters. The value of $C_{C1}$, $C_{C2}$, or $L_C$ could be zero. Impedance $Z_{COMP}$ can be tuned over a wide range by changing the circuit parameters. For suitable values of the parameters, the reflection created by $Z_{COMP}$ will approximate the reflection from antenna match 102 at a particular frequency or over a range of frequencies. The component values can be adjusted by use of the tracking algorithm 802 (not shown in FIG. 9). Persons of skill in the art of filter design will recognize that other circuit configurations can be used to produce an adjustable impedance having a desired frequency response. The embodiment of FIG. 9 is suitable at least to cancel reflection from the antenna match 102 over a narrow frequency range.

Figure 10:
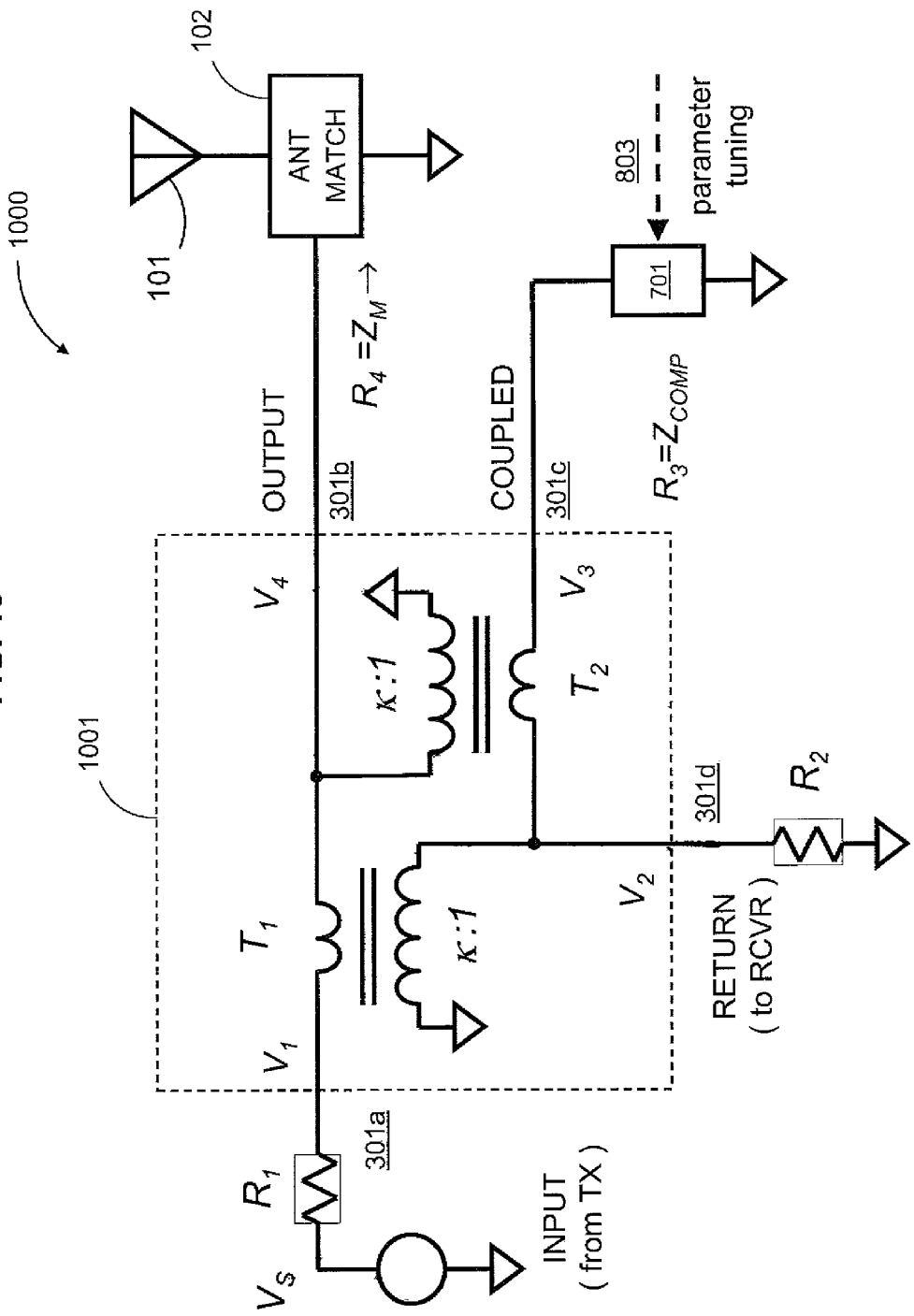
FIG. 10 illustrates a directional notch filter using a directional coupler that includes two transformers.

FIG. 10 illustrates how the compensating impedance 701 functions with circuit 1001, a representative implementation of a directional coupler, to produce a directional notch filter that cancels signal reflection from antenna match 102, in accord with one or more embodiments of the invention. The circuit of FIG. 10 is suitable for HF-VHF-UHF frequencies and can be built to handle several watts in the forward path. Transformers $T_1$ and $T_2$ are substantially identical. FIG. 10 illustrates operation with a thru or forward path from port 301a to bidirectional port 301b and a coupled path from port 301a to port 301c. Port 301d is the receiver port, which may be recognized by those practiced in the art as an isolated port. The voltages at ports 301a-301d with respect to ground are $V_1$, $V_4$, $V_3$, and $V_2$, respectively. A signal applied at port 301b ($V_4$) would be coupled to port 301d ($V_2$) with the same coupling factor as port 301a ($V_1$) is coupled to port 301c ($V_3$).

Circuit 701 presents to port 301c an impedance of $Z_{COMP}$. A transmitter signal provided on port 301a of directional coupler 1001 operatively drives a primary side of a current sensing transformer $T_1$ in the upper path, which is then operatively connected to and outputted from bidirectional port 301b. The primary side of the current sensing transformer $T_1$ is operatively connected to antenna matching circuit 102, which in turn is operatively connected to the antenna 101. The secondary side of current sensing transformer $T_1$ is operatively connected to receiver port 301d.

A sample of the incoming received signal is obtained from a second transformer $T_2$, which has a secondary side operatively connected to antenna 101 through antenna matching circuit 102. The received signal sampled by second transformer $T_2$ creates a current through the primary side of transformer $T_2$, which in turn passes through impedance $Z_{COMP}$ and which opposes the current from the secondary side of current sensing transformer $T_1$. For a predetermined frequency, the receiver port 301d is isolated from the transmitter port 301a when the secondary current in transformer $T_1$ is substantially equal to the primary current in transformer $T_2$ at that frequency.

In FIG. 10, voltage $V_S$ and impedance $R_1$ comprise a Thevenin equivalent circuit for the transmitter, $R_2$ represents the receiver impedance, $R_4=Z_M$ is the input impedance of the antenna match and $R_3=Z_{COMP}$ is the compensation impedance. It is assumed that transformers $T_1$ and $T_2$ are substantially ideal for sake of this analysis, for which the mutual inductance is related to the primary and secondary inductances as $M^2=L_1L_2$. In this situation $$V_2 = \kappa(V_4 - V_1) \tag{2}$$

$$V_4 = \kappa(V_2 - V_3) \tag{3}$$

where $\kappa=\sqrt{L_2/L_1}$ is the transformer turns-ratio. For wideband operation we can further assume that $2\pi f L_2 >> R_4$ or $R_2$, in which case the transformer currents are also related by $\kappa$ in the usual fashion such that power is conserved. Application of the Kirchhoff nodal relationships with the transformer response gives:

$$V_2(\kappa^2 - 1) = \kappa^2 V_3 + \kappa V_1 \tag{4}$$

$$\frac{V_2}{R_2} + \frac{V_3}{R_3} = \frac{-I_S}{\kappa} \tag{5}$$

$$\frac{V_3}{R_3} = \kappa\left(\frac{V_4}{R_4} - I_S\right) \tag{6}$$

where $I_s$ is the current flow through $R_1$. Solving these equations for $V_2$ and $V_3$ gives the relationship:

$$V_2\left(\frac{1}{R_2} + \frac{1}{R_4}\right) = V_3\left(\frac{1}{R_4} + \frac{1}{\kappa^2 R_3} - \frac{1}{R_3}\right) \tag{7}$$

Combining Eqns. 4 and 7 leads to a relationship for the transmitter leakage into the receiver port:

$$\frac{V_2}{V_1} = \frac{1}{\kappa} \frac{\left((1-\kappa^{-2})\frac{R_4}{R_3} - 1\right)}{\left(\kappa^{-2} + (1-\kappa^{-2})^2\frac{R_4}{R_3} + \frac{R_4}{R_2}\right)} \tag{8}$$

Eqn. 7 corresponds to the addition of signals 308 and 703 in FIG. 7. The negative sign in the last term of Eqn. (7) allows the two ports to be isolated, as seen in Eqn. (8). The null condition does depend on $\kappa$ but not the port impedance $R_S$ or $R_2$. The input impedance seen looking into the coupler, $R_{IN}=V_1/I_S$, can be computed from the above expressions using $$I_S = -\kappa\left(\frac{V_2}{R_2} + \frac{V_3}{R_3}\right) \tag{9}$$

The final relationship for $V_1$ required to describe the coupler response is given by $$\frac{V_1}{V_S} = 2 \cdot \frac{R_{IN}}{R_S + R_{IN}} \tag{10}$$

The factor of 2 is included in Eqn. 10 to provide a gain of 1 with a matched load. Equations 4-10 provide an implicit solution for the coupler response when $V_3$ is treated as an independent variable. Several useful results can be deduced from this analysis. The coupled port gain-$V_3/V_S$ primarily depends on the transformer turns ratio κ as the ratio 1/κ. The thru port gain $V_4/V_S$ and the input return loss at port 301*a* are correlated with coupling gain.

Figure 11:
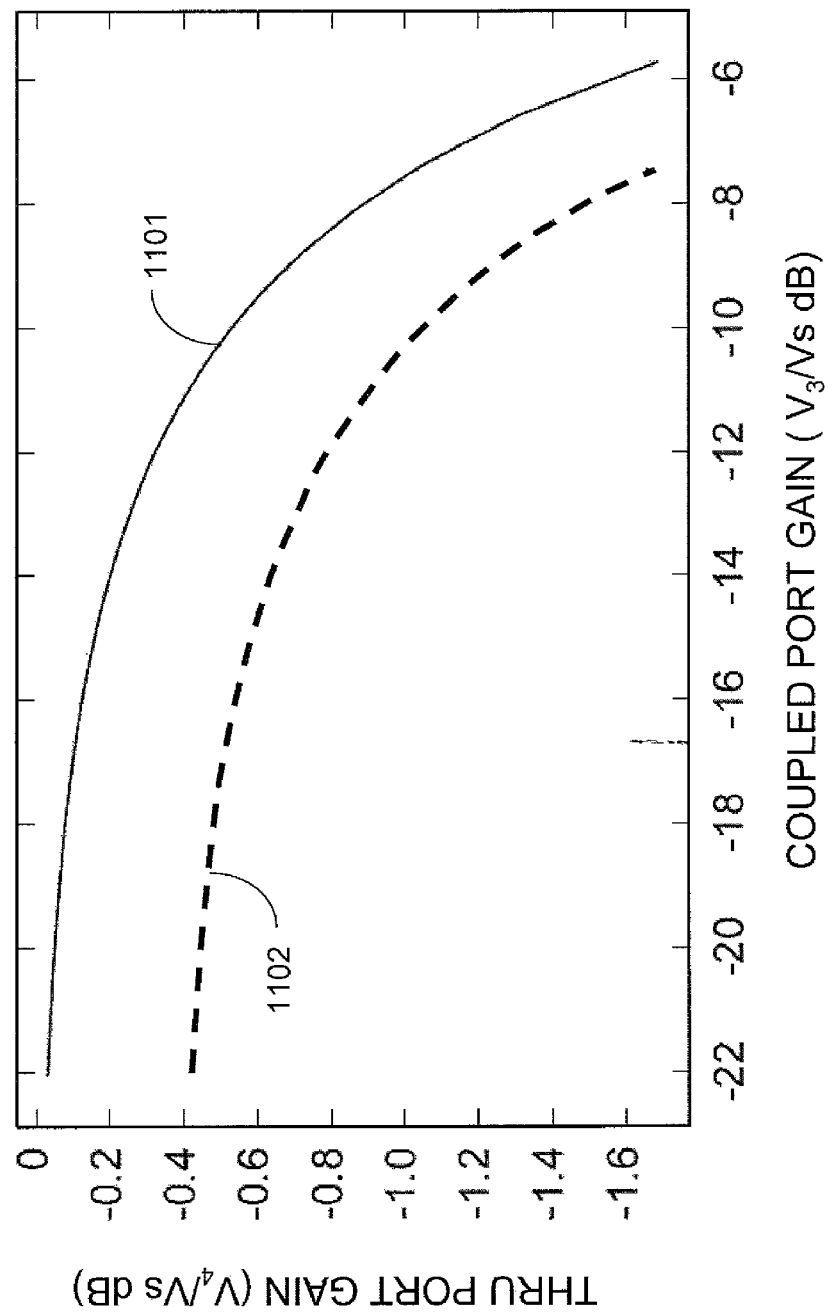
FIG. 11 illustrates a predicted relationship between through port gain and coupled port gain for a directional coupler.

FIG. 11 shows the predicted relationship between thru port gain $V_4/V_S$ and coupled port gain $V_3/V_S$ as curve 1101. This relationship determines how receive and transmit path impairments can be apportioned to obtain improved overall system performance. The predicted curve 1101 shown in FIG. 11 can be compared with the data presented in FIG. 4. Curve 1102 is a portion of curve 402 in FIG. 4. The small difference between 1101 and 1102 confirms the assumption that the transformer behavior is nearly ideal in this application. The observed response curve 1102 exhibits a small loss of 0.4-2 dB that is not predicted by the analysis of circuit 1000.

Transmitter signal leakage from the input port 301*a* into the receive path at port 301*d* depends on the load impedance looking into the antenna match $R_4=Z_M$, the impedance at the compensation port $R_3=Z_{COMP}$ and transformer turns ratio κ. The ratio of the voltage of leakage signal 114 to the voltage of transmit signal 113 in the absence of receive signal 312 can be expressed using Equation 8 as $$\left. \frac{V(114)}{V(113)} \right|_{V(312)=0} \propto \frac{\kappa^2-1}{\kappa^2} - \frac{Z_M}{Z_{COMP}} - 1 \qquad (11)$$

For κ≈3, corresponding to a 1 dB/10 dB directional coupler, the coupled interference signal can be made to become very small when $Z_{COMP} \approx Z_M$. In many cases this condition can be achieved over a useful frequency range by use of a simple compensation network made from one or more inductors, capacitors, and resistors as illustrated by circuit 900.

Over a small range of frequency the impedance seen looking into the antenna match and compensation network can be expressed as a complex Taylor series about a nominal angular frequency $\omega_0$:

$$Z_M = a_0 + ja_1(\omega-\omega_0) + a_2(\omega-\omega_0)^2 + ja_3(\omega-\omega_0)^3$$

$$Z_{COMP} = b_0 + jb_1(\omega-\omega_0) + b_2(\omega-\omega_0)^2 + jb_3(\omega-\omega_0)^3 \qquad (11)$$

where $$\{a_i, b_i\}_{i=0}^3$$

are real constants and $\omega=2\pi f$ is the angular frequency. For the typical situation where $\kappa^2 \gg 1$, the power in the receive port attributed to transmitter leakage is nearly proportional to $$P_{CPL} \propto (a_0-b_0)^2 \int V_{TX}^2(\omega) d\omega + (a_1-b_1)^2 \int (\omega-\omega_0)^2 V_{TX}^2(\omega) d\omega + \quad (12)$$
$$(a_2-b_2)^2 \int (\omega-\omega_0)^4 V_{TX}^2(\omega) d\omega +$$
$$(a_3-b_3)^2 \int (\omega-\omega_0)^6 V_{TX}^2(\omega) d\omega$$

The power in the coupled port is a convex function of the difference $(a_1-b_1)$ for each term in Eqn. 12. There is a clear advantage when the compensation impedance closely approximates the equivalent circuit for the antenna and matching network. A simple optimization process can be used, such as sequentially scanning the element values of the compensation impedance, to arrive at values of $a_i \approx b_i$ sufficient to cancel the transmitter leakage. The level of leakage suppression benefits from good delay matching between antenna and compensation impedance. A DSP approach is better when delay matching is not feasible.

Figure 12:
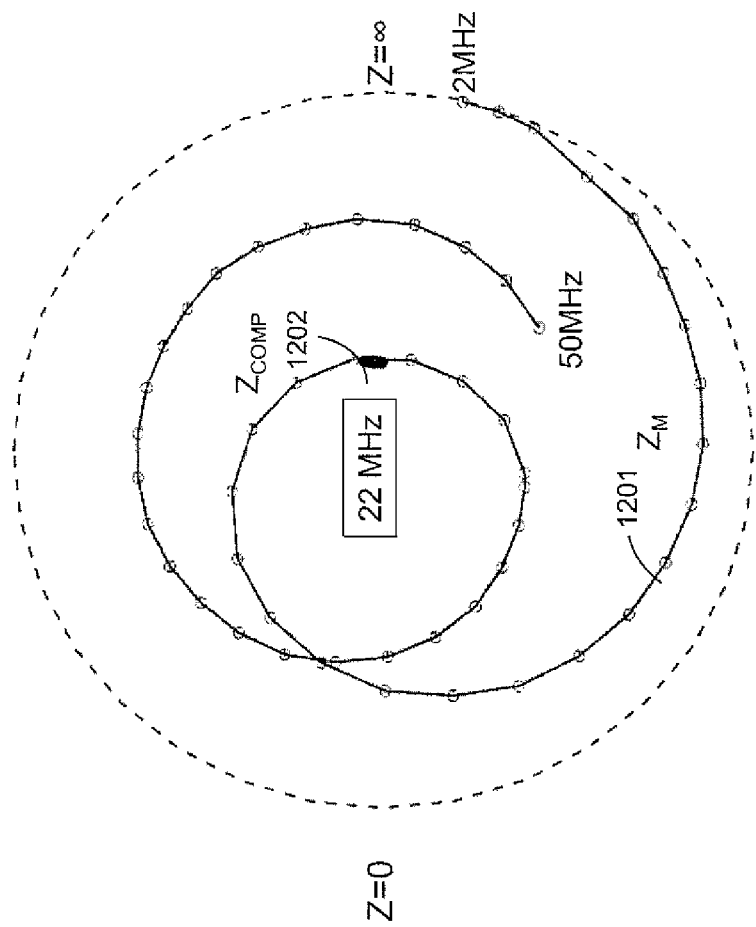
FIG. 12 illustrates reflection from a matched MS116-118 antenna and a corresponding compensation impedance.

In FIG. 12, curve 1201 is the Smith chart representation of the measured reflection from a simple matching network and a MS116-118 three meter whip antenna. The reflection from the matched antenna is similar to that of a parallel RC network over a small frequency range centered at about 22 MHz. The reflection from a corresponding compensation impedance with $R_C=76\Omega$ and $C_{C1}=4$ pF ($L_C=0$ and $C_{C2}=0$) is also shown in FIG. 12 as solid points 1202. The two curves overlap at 22.05 MHz where leakage suppression is desired.

Figure 13:
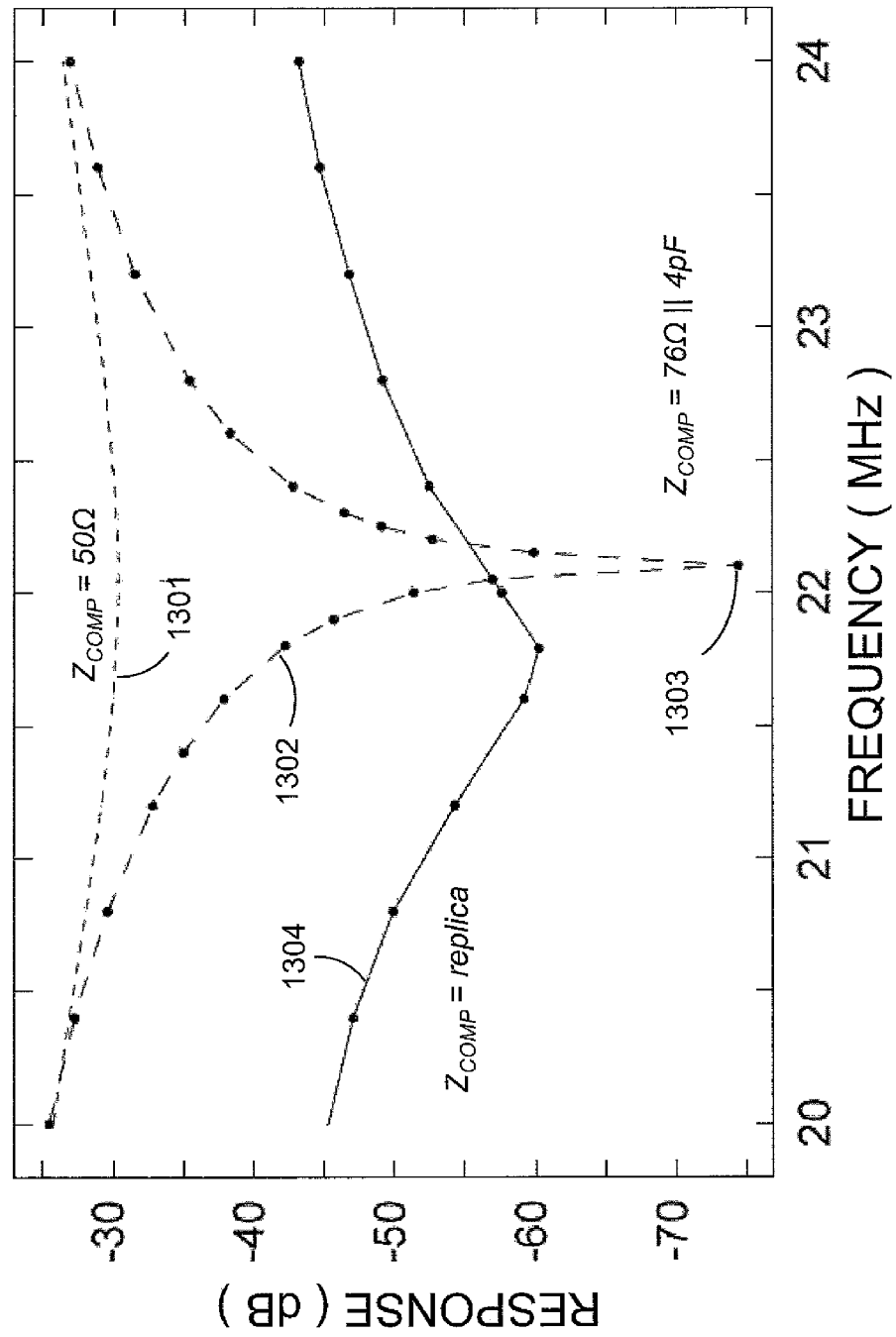
FIG. 13 illustrates a comparison of measured transmit signal rejection obtained with two embodiments of the invention.

FIG. 13 shows the measured transmitter leakage for two implementations of the directional notch filter along with the response of a directional coupler used in accordance with prior art. Curve 1301 represents transmitter leakage when $Z_{COMP}$ is a 50Ω termination impedance according to the prior art: there is 20 dB of antenna match return loss and 10 dB of coupler loss. Curve 1302 is the directional notch filter response for a simple compensation impedance comprised of a resistor $R_C=76\Omega$ in parallel with a capacitor $C_{C1}=4$ pF as represented by curve 1202 in FIG. 12. The notch filter further attenuates the leakage by >25 dB over a 200 kHz frequency range. Point 1303 identifies the bottom of the notch at 22.05 MHz where the attenuation is 40 dB. Curve 1304 represents the response when the compensation impedance is a replica circuit described in the next two figures.

Figure 14:
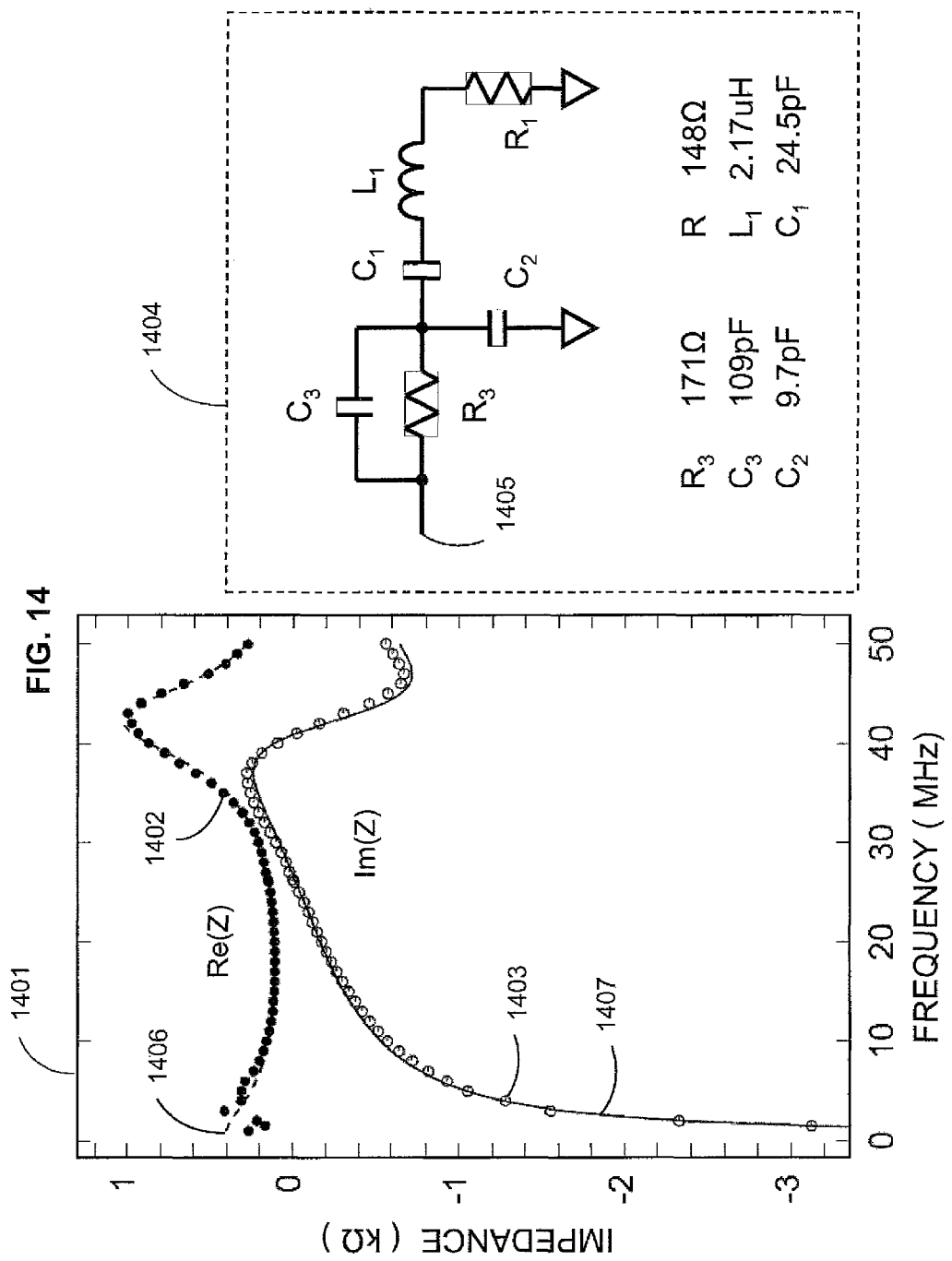
FIG. 14 illustrates measured impedance and a Darlington model of a MS116-118 whip antenna with a counterpoise on damp ground.

FIG. 14 presents a semi-empirical model based on circuit theory for an MS116-118 whip antenna having a strap counterpoise on moist ground. Graph 1401 illustrates the measured impedance as a function of frequency; plurality of points 1402 and 1403 represent the real and imaginary components of the impedance, respectively. The antenna impedance does not change much for a stationary antenna mounted on a Short stand with a 5 m counterpoise (i.e., a 5 m ground wire). Circuit 1404 represents an equivalent circuit for the antenna: node 1405 corresponds to the antenna input. Model parameters can be determined by fitting the impedance seen at node 1406 to the measured impedance data 140-2, 1403 using least squares regression: curves 1406 and 1407 represent the fitted response with the parameters specified in the figure. A simple circuit can accurately replicate the antenna impedance over the entire HF band.

For an antenna whose impedance changes slowly and/or by a small amount, a manually tuned LRC network may be adequate to compensate for antenna reflection. However, the impedance of a human-portable whip antenna is sensitive to antenna position and counterpoise configuration. The tracking circuit should be constructed to adjust $Z_{COMP}$ so that it preferably tracks the antenna impedance $Z_M$ using the equivalent circuit for the antenna described in FIG. 15 and a duplicate matching network. Dynamic compensation may also be useful under less favorable circumstances, such as that due from proximity effects, i.e., a radial electric near field interaction with personnel and soils, due to both their water content, as water is a polar molecule of high permittivity, and loss tangent.

Figure 15:
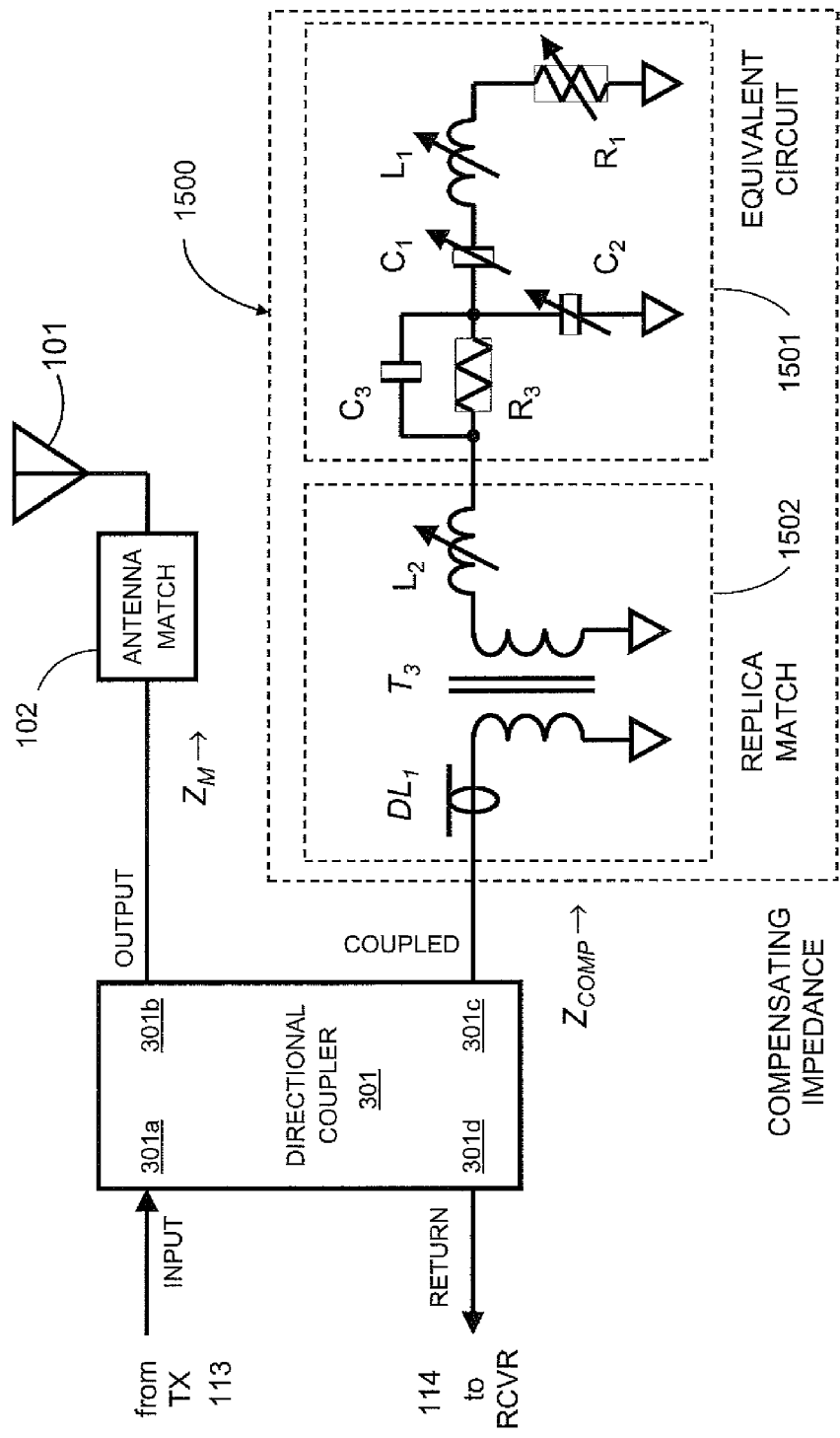
FIG. 15 illustrates an adjustable RLC network, including a replica of an antenna matching network and an equivalent circuit for an antenna, to cancel more broadly the reflection from antenna mismatch.

FIG. 15 presents a circuit 1500 of another embodiment in accord with one or more embodiments of the invention, for a compensating impedance 701 producing a compensating signal 703. This embodiment is suitable for mitigating transmitter phase noise as well as mitigating mixer overload. The directional coupler 301 uses a reflection from $Z_{COMP}$, as produced using a replica of the antenna matching network 1502 and an equivalent circuit for a whip antenna 1501, in order to cancel the reflection from antenna mismatch broadly over frequency. Circuit 1502 includes a delay line $DL_1$ that matches the delay between coupler port 301b and antenna match 102.

FIG. 13 illustrated the measured curve 1302 of transmit signal rejection obtained with directional notch filtering using a simple $Z_{COMP}$, for instance as provided in the embodiment illustrated in FIG. 9. FIG. 13 also includes measured curve 1304 of transmit signal rejection obtained with compensation that includes a replica of the antenna matching network 1502 and an equivalent circuit for the antenna 1501, as illustrated in FIG. 15. The suppression of transmitter leakage is >20 dB over the frequency range 20-24 MHz. The notch depth for curve 1304 is 30 dB at 21.73 MHz, relative to the traditional 50Ω termination represented by curve 1301.

A broader response like that of curve 1304 can better compensate for broadband leakages, such as phase noise, than more narrow responses like that of curve 1302. As illustrated by the signal flow in FIG. 7, the notches in curves 1302 and 1304 are path dependent and therefore selective; they do not significantly affect the received signal 312 originating at the antenna port. This behavior cannot be achieved using a conventional two-port notch filter that is inserted after the coupler.

Figure 16:
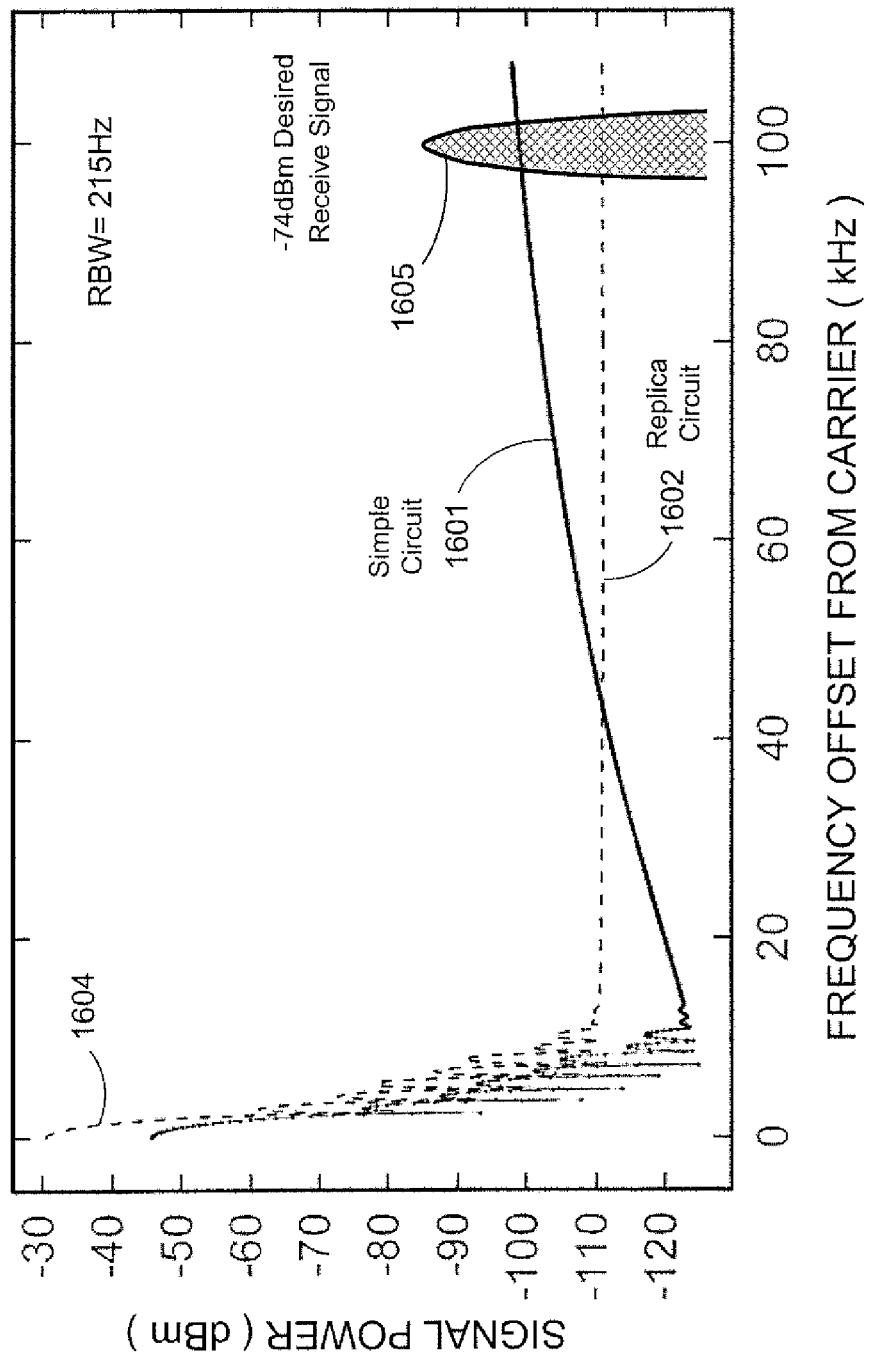
FIG. 16 illustrates transmit signal rejection obtained with the embodiment of FIG. 15.

FIG. 16 illustrates the suppression of transmit leakage that is obtainable using the compensation circuit of FIG. 9 and the compensation circuit of FIG. 15. Curve 1601 is the remaining transmit leakage after using the compensation circuit of FIG. 9. Curve 1602 is the remaining transmit leakage after using the compensation circuit of FIG. 15. It can be seen the curve 1602 provides more power separation from the desired received signal 1605 (i.e., greater SNR), therefore the compensation circuit of FIG. 15 provides more effective compensation than the compensation circuit of FIG. 9. Furthermore, the flatter shape of curve 1602 shows that SNR will be relatively insensitive to frequency offset from carrier. The primary signal leakage 1604 for the circuit of FIG. 15 is slightly greater than the leakage 1603 for the circuit of FIG. 9.

Figure 17:
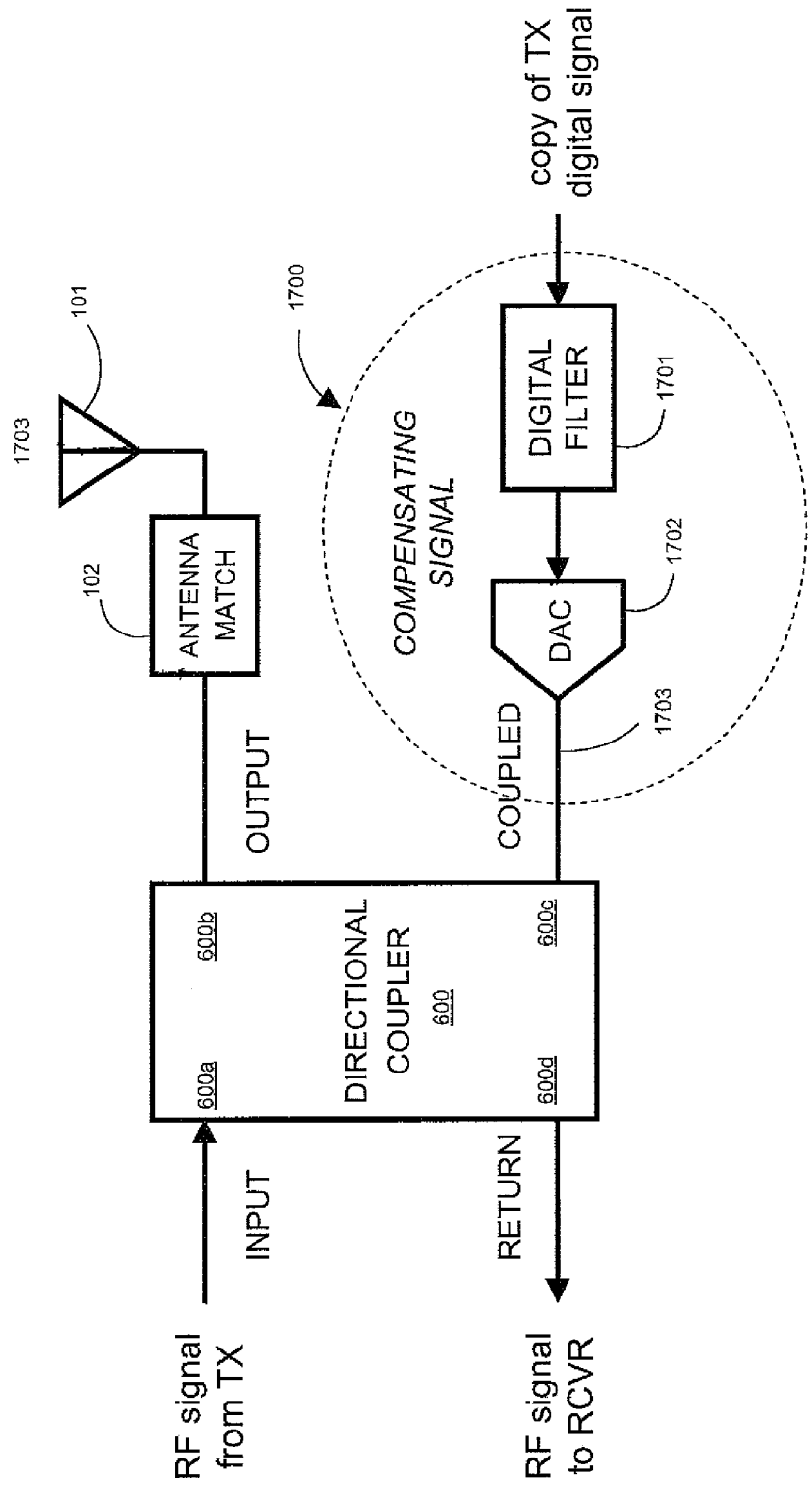
FIG. 17 illustrates a block diagram of directional notch filter using a digital filter and a DAC to create signal that cancels reflection from antenna match.

FIG. 17 presents a circuit 1700 of another embodiment in accordance with one or more embodiments of the invention, for producing a compensating signal. The circuit produces a directional notch filter by use of a digital filter 1701 and digital to analog converter ("DAC") 1702 to create a compensating signal 1703 equivalent to signal 703 that replicates and cancels reflection from the antenna match 102. This is an alternative to the method of FIG. 7 which employs an analog circuit approach to replicate and cancel the reflection from antenna match 102 with compensating signal 703. The directional coupler 301 in FIG. 17 is used as a unidirectional RF power combiner and not as an impedance bridge. The portion of transmit signal 113 emerging as signal 305 at port 301c is absorbed by the output impedance of DAC 1702.

Figure 18:
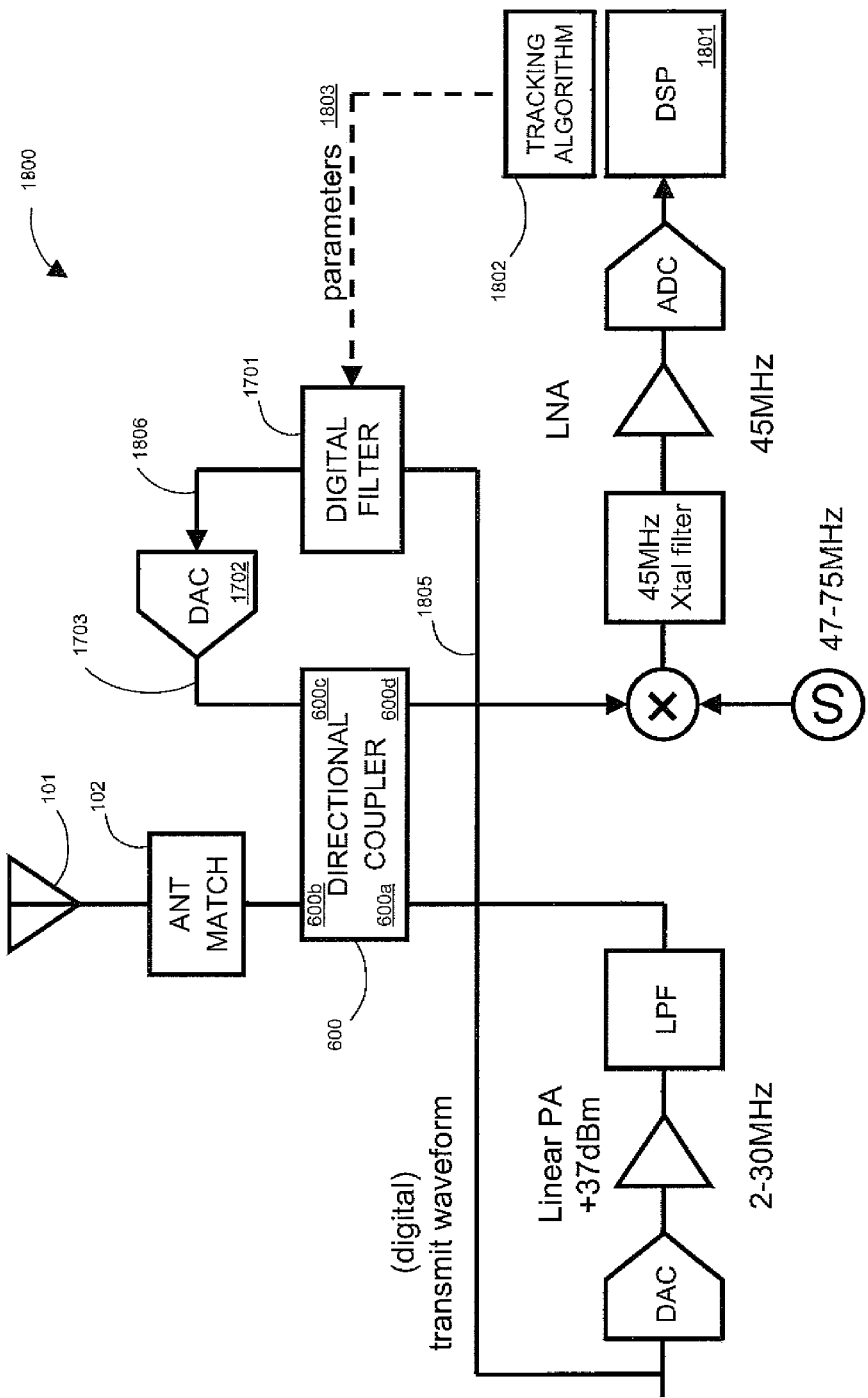
FIG. 18 illustrates a block diagram of a transceiver with a digitally synthesized directional notch filter and a control path to tune a response of a digital filter.

FIG. 18 illustrates a transceiver architecture to adjust the digital filter 1701. A tracking algorithm 1802 associated with a DSP 1801 provides parameters 1803 to a digital filter 1701. A digital copy 1805 of the transmit waveform is also supplied as input to digital filter 1701. Digital filter 1701 generates a replica of the leakage signal produced by antenna matching circuit 102 and antenna 101. Digital filter 1701 produces as output signal 1806 the additive inverse of the replicated leakage signal. Digital filter 1701 drives DAC 1702, which provides an analog compensating signal into port 301c of directional coupler 301. As with the embodiment of FIG. 8, the tracking algorithm may use a conventional gradient search method to tune the compensation impedance parameters 1803 in real-time. Tracking algorithm 1802 may be implemented as one or more processors that are programmed with software stored in a storage medium, the software being configured to perform the tracking algorithm 1802 by use of spectral, temporal, and/or power characteristics of the received signal 313, the mismatch reflection signal 308, and/or the compensation signal 703, as determined by DSP 1801. Tracking algorithm 1802 may be implemented in a manner as described by the implementation for tracking algorithm 802.

Returning again to network 200 shown in FIG. 2, usage of a directional coupler 301 and compensating impedance 701 as described in FIGS. 6-18 and related text can be utilized in recruited nodes 202 to reduce self-interference and improve the performance of a network 200 cooperatively communicating via an OTH channel 208 to a distant receiver 203.

Cooperative communications by recruited nodes 202 on the OTH channel 208 provides approximately 14 dB of gain, derived as about 6 dB gain from coding, and about another 8 dB gain from incoherent signal combining (10 logN, assuming N≈6). For example, cooperation of 6 nodes can produce the same effective response as a 100 W transmitter, but with far less size, weight, and power ("SWAP") burden on the user carrying the portable transceiver. Transceiver SWAP is important for improved operational life and reduced form factor for better mobility and logistics. Cooperative communications also allows each node to communicate with the distant receiver using less radiated power per node than would be used by a single node communicating to the distant receiver at an equivalent data rate. Cooperative communications may also permit network 200 to continue operative with the loss of one or more nodes 202, albeit at a reduced level of performance. Therefore, cooperative communications enhances the covertness of the nodes, helps maintain a low probability of interception of communications from the nodes, and enhancing robustness of the network.

TABLE 1

| Channel: | RECRUITMENT | OVER THE HORIZON |
|---|---|---|
| Modulation: | BPSK | QPSK |
| Rate: | 2.4 kS/s | 2.4 kS/s |
| Duty Cycle: | 100% | 100% |
| Bandwidth: | 4 kHz | 4 kHz |
| Carrier Frequency: | Variable within 2-30 MHz | Offset from Recruitment Carrier by 100 kHz |
| Power Amplifier Output: | 5 W (+37 dBm) | 5 W (+37 dBm) |

Features of waveforms and frequency plans suitable for one or more embodiments of the present invention are shown in Table 1. The recruitment channel may be a BPSK-modulated RF carrier signal, the carrier having a variable carrier frequency within the range of 2-30 MHz. The BPSK modulation typically is at a rate of 2.4 kS/s, producing a modulation bandwidth of approximately 4-6 kHz. This symbol rate will be adequate to support text communication and/or low-bit-rate vocoded voice. The carrier frequency offset of the BPSK signal can be measured, and the BPSK signal can be demodulated in the absence of severe multipath interference.

The distant receiver 204 of the OTH channel 203 is typically spaced much farther from the transmitting recruited nodes 202 than the spacing between the master node 201 and the recruited nodes 202, therefore a higher capacity waveform such as QPSK is used for the OTH channel 203 in order for the OTH channel 203 to be more robust through inclusion of increased error detection and correction coding overhead. Usage of a different modulation scheme on the OTH channel 203 from that of the recruitment channel 205 also helps mitigate self-interference effects.

The frequency plan of network 200 may be further designed to provide a relatively small frequency separation between the recruitment channel 205 and the OTH channel 203, by use of a pair of closely spaced frequency division multiplexed ("CS-FDM") signals, one frequency for the recruitment channel 205 and the other frequency for the OTH channel 203. By use of separate frequencies, the master node 201 and recruited nodes 202 can transmit simultaneously without the need for time slot (i.e., time-division multiplex, "TDM") or code-division multiplex ("CDM") synchronization. Whereas communication based on TDM would use relatively short signal intervals to switch between transmissions by the master node 201 and transmissions by the recruited nodes 202, communication based on CS-FDM can use a substantially uninterrupted recruitment signal in order to simplify synchronization of recruited nodes 202. Communication based on CS-FDM lessens or avoids the task of aligning time slots among a group of cooperating recruited nodes 202. The frequency separation between the recruitment channel 205 and the OTH channel 203 is typically about 100 kHz. An upper limit of the frequency separation is determined by antenna matching of the whip antenna (i.e., the Fano-Bode limit) which limits the instantaneous bandwidth to approximately 100-500 kHz. Communication based on CS-FDM is more spectrally efficient than a communication scheme that uses separate a transmit band of frequencies and a separate receive band of frequencies in a transceiver. Interference between closely spaced transmit and receive frequencies is lessened by use of a compensating impedance, such as that described in FIGS. 6-18.

It should be understood that one or more transmit or received functions may be implemented by a software defined radio having a processor programmed with software designed to replicate the functions described herein. There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (for example, hardware, software, and/or firmware). The choice of vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (for example, as one or more programs running on one or more computer systems), as one or more programs running on one or more processors (for example, as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (for example, a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, an optional video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (for example, feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

All references, including but not limited to patents, patent applications, and non-patent literature are hereby incorporated by reference herein in their entirety.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method to reduce interference between an interfering transmitted signal and a received signal in a transceiver, comprising the steps of:
    receiving a transmitter signal at a first port of a directional coupler;
    splitting the transmitter signal into a first transmit portion directed to a second port of the directional coupler, and a second transmit portion directed to a third port of the directional coupler, wherein the second port is coupled to an antenna and the third port is coupled to an adjustable impedance;
    filtering the second transmit portion by use of the adjustable impedance to produce a filtered second transmit portion;
    reflecting at least a portion of the filtered second transmit portion into the third port of the directional coupler;
    receiving an incoming signal at the second port of the directional coupler, the incoming signal including a received portion and a reflected portion, wherein the reflected portion is a partial reflection of the first transmit portion;
    combining the incoming signal at the second port of the directional coupler and the reflected signal at the third port of the directional coupler, to produce a combined signal at a fourth port of the directional coupler, and
    adjusting the adjustable impedance based on a spectral, temporal, and/or power characteristic of the transmitter signal and a spectral, temporal, and/or power characteristic of an impedance load coupled to the second port;
    wherein, in the combined signal, the reflected signal from the third port cancels at least a portion of the partial reflection of the first transmit portion from the second port;
    wherein the adjustable impedance produces a notch frequency rejection in the combined signal using $Z_{COMP}$, where $Z_{COMP}$ is an impedance estimated by the equation $$Z_{COMP}=b_0+jb_1(\omega-\omega_0)+b_2(\omega-\omega_0)^2+jb_3(\omega-\omega_0)^3,$$

where $\{b_i\}_{i=0}^3$ are real constants and $\omega$ is an angular frequency, the notch frequency centered at a carrier frequency of the transmitter signal, and $\omega_0$ is a nominal angular frequency.

2. The method of claim 1, further comprising the step of adjusting the adjustable impedance based on a characteristic of the transmitter signal.

3. The method of claim 1, further comprising the step of injecting into the third port of the directional coupler a filtered sample of the transmitter signal, wherein the transmitter signal is filtered by use of a tracking algorithm adjusting the adjustable impedance coupled to the combined signal.

4. The method of claim 1, wherein the filtered and reflected second transmit portion cancels at least a portion of the partial reflection of the first transmit portion within a predetermined bandwidth.

5. The method of claim 1, wherein the adjustable impedance produces a rejection in the combined signal, over a predetermined range of frequencies including a carrier frequency of the transmitter signal.

6. An apparatus for cancelling at least a portion of an interfering transmitted signal from a received signal in a transceiver, comprising:
    a four-port directional coupler, wherein a first port is an input port coupled to a bidirectional second port and a bidirectional third port, the bidirectional third port is further connected to a fourth port, and the fourth port is an output port further coupled to the second port, wherein the transmitted signal is provided to the first port;
    an adjustable source coupled to the third port; and
    a controller to control the adjustable source based on a spectral, temporal, and/or power characteristic of the transmitted signal detected at the fourth port;
    wherein the adjustable source comprises an adjustable RLC network configured to receive a signal from the third port, and inject a filtered reflection of the signal into the third port; and
    wherein the adjustable RLC network is adjusted to match an impedance load presented at the second port using an adjusted impedance match;
    wherein the adjusted impedance match is a complex impedance $Z_{COMP}$ approximating a reflection match presented at the second port, at a particular frequency or over a range of frequencies, where $Z_{COMP}$ is an impedance estimated by the equation $$Z_{COMP}=b_0+jb_1(\omega-\omega_0)+b_2(\omega-\omega_0)^2+jb_3(\omega-\omega_0)^3,$$

where $\{b_i\}_{i=0}^3$ are real constants and $\omega$ is an angular frequency and $\omega_0$ is a nominal frequency.

7. The apparatus of claim 6, wherein the adjustable source comprises an adjustable reflection of a signal emitted from the third port.

8. The apparatus of claim 6, wherein the controller comprises a processor coupled to a memory storage, the memory storage configured to store a tracking algorithm, wherein the tracking algorithm is operably coupled to the signal from the fourth port.

9. The apparatus of claim 8, wherein the adjustable source comprises a digital filter having an input coupled to the transmitted signal and an output coupled to the third port, wherein the digital filter is operably controlled by the tracking algorithm.

* * * * *

UNITED STATES PATENT AND TRADEMARK OFFICE
CERTIFICATE OF CORRECTION

PATENT NO. : 8,798,546 B2  
APPLICATION NO. : 13/017482  
DATED : August 5, 2014  
INVENTOR(S) : Banwell et al.

It is certified that error appears in the above-identified patent and that said Letters Patent is hereby corrected as shown below:

In the Specification

In Column 6, Line 34, delete "single-output)" and insert -- single-output --, therefor.

In Column 13, Line 3, delete "gain-$V_3/V_S$" and insert -- gain $V_3/V_S$ --, therefor.

In Column 13, Line 43, delete "$Z_{COMP}b_0$" and insert -- $Z_{COMP} = b_0$ --, therefor.

In Column 13, Line 64, delete "$(a_1-b_1)$" and insert -- $(a_i-b_i)$ --, therefor.

In Column 14, Line 38, delete "Short stand" and insert -- short stand --, therefor.

In Column 14, Line 42, delete "140-2, 1403" and insert -- 1402, 1403 --, therefor.

Signed and Sealed this  
Twenty-sixth Day of May, 2015

Michelle K. Lee  
*Director of the United States Patent and Trademark Office*